US005901025A

United States Patent [19]

Takahashi et al.

[11] Patent Number: 5,901,025

[45] Date of Patent: May 4, 1999

[54] CIRCUIT BREAKER

[75] Inventors: Tatsunori Takahashi; Takumi Fujihira; Naoshi Uchida; Katsunori Kuboyama; Hiroaki Tosaka; Kentaro Toyama; Koji Nomura; Isamu Nagahiro, all of Saitama, Japan

[73] Assignee: Fuji Electric Co., Ltd., Kawasaki, Japan

[21] Appl. No.: 08/933,106

[22] Filed: Sep. 18, 1997

[30] Foreign Application Priority Data

Sep. 19, 1996 [JP] Japan .................................... 8-269447
Mar. 10, 1997 [JP] Japan .................................... 9-072666

[51] Int. Cl.[6] ........................................................ H02H 3/00

[52] U.S. Cl. ................................ 361/93; 361/23; 361/115

[58] Field of Search ................................ 361/23, 24, 25, 361/93, 115; 335/6, 42

[56] References Cited

U.S. PATENT DOCUMENTS 4,088,973 5/1978 Kussy et al. ................................ 335/6

*Primary Examiner*—Jeffrey Gaffin
*Assistant Examiner*—Stephen Jackson
*Attorney, Agent, or Firm*—Kanesaka & Takeuchi

[57] ABSTRACT

A circuit breaker includes a current path for first and second contacts connected in series in an insulative container. When an overcurrent occurs by over load, the second contact is opened based on a command from a time delay trip portion of an overcurrent trip device. When a short-circuit current occurs, the first and second contacts are opened based on a command from an instantaneous trip portion of the overcurrent trip device. Since the first and second contacts are contained in a common container, the wiring works between the first contact and the second contact is unnecessary. Since the first and second contacts are opened in the instantaneous trip, interruption of a high short-circuit current is facilitated.

14 Claims, 21 Drawing Sheets

CIRCUIT BREAKER

BACKGROUND OF THE INVENTION AND RELATED ART STATEMENT

The present invention relates to a circuit breaker used in a low voltage distribution circuit for a motor control or a wiring protection.

FIG. 37 is a front view of a conventional combination of a wiring circuit breaker and an electromagnetic switch. Referring now to FIG. 37, a motor circuit is protected by a combination of a wiring circuit breaker 110 and an electromagnetic switch 120. The load side terminals of the wiring circuit breaker 110 and the power supply side terminals of the electromagnetic switch 120 are connected phase by phase with conductors 130 (drawing shows three phases). FIG. 38 shows internal connections of the conventional circuit breaker and electromagnetic switch of FIG. 37. Referring now to FIG. 38, the wiring circuit breaker 110 includes contacts (hereinafter referred to as "first contacts") 111, and overcurrent trip devices 112, which are disposed for the respective phases for interrupting an overcurrent. The first contacts 111 are closed and opened by manually operating a breaker mechanism 113. The first contacts 111 are also opened by the breaker mechanism 113 based on a trip signal from the overcurrent trip device 112.

More in detail, when a handle 113*a* is turned under the state that the breaker mechanism 113 is reset where the latch is locked, an operation of an open-close spring to toggle links (not shown) is inverted to close or open the first contacts 111. When the latch is released by the trip signal from the overcurrent trip device 112, the breaker mechanism 113 releases the energy stored in the open-close spring to open the first contacts 111. The overcurrent trip device 112 includes a time delay trip portion 112*a* and an instantaneous trip portion 112*b*. The time delay trip portion 112*a* detects an overload current and feeds a trip signal to the breaker mechanism 113 after a period of time corresponding to the value of the overload current has passed. The instantaneous trip portion 112*b* detects a high current, such as a short-circuit current, and instantaneously feeds an instantaneous trip signal to the breaker mechanism 113.

In FIG. 38, the electromagnetic switch 120 includes contacts (hereinafter referred to as "second contacts) 121, thermal relays 122 and an electromagnet 123 for closing and opening the second contacts 121. When an overload current occurs, one of the thermal relays 122 breaks the control circuit of the electromagnet 123 to open the second contacts 121.

Since the conventional circuit breaker 110 and electromagnetic switch 120 are connected with each other with the conductors, a wiring space is necessary between the circuit breaker 110 and electromagnetic switch 120, and the wiring work is cumbersome. Since the circuit breaker 110 and electromagnetic switch 120 respectively include independent protecting means for protection from the overcurrent, both protecting means wastefully overlap in the overload protection region.

In view of the foregoing, the present invention has been made, and it is an object of the invention to provide a circuit breaker that does not need any wiring work between the first contacts and the second contacts.

It is another object of the invention to provide a circuit breaker as stated above, which avoids overlapping of the overcurrent protecting means of both contacts.

SUMMARY OF THE INVENTION

According to a first aspect of the invention, there is provided a circuit breaker, which includes current paths, each disposed for one of the phases, each of the current paths including a first contact and a second contact arranged in series; an open-close mechanism for releasing the energy stored therein in response to a reset operation to open the first contact by the released energy; an electromagnet for opening and closing the second contact in response to a control signal; an overcurrent trip device for detecting an overcurrent in the current paths, the overcurrent trip device feeding a trip signal to the open-close mechanism and the electromagnet; and an insulative container for housing therein the current paths including the first contacts and the second contacts, the open-close mechanism, the electromagnet and the overcurrent trip device. By housing the first and second contacts in an insulative container, the first and the second contacts are compactly integrated, so that the wiring work between the first and second contacts becomes unnecessary and the installation space for the circuit breaker is reduced. By controlling the first and second contacts by the common overcurrent trip device, duplication of the overload protection means is avoided.

Advantageously, the open-close mechanism opens the second contacts after a predetermined period of time has passed since the open-close mechanism detected an overcurrent caused by over load. Advantageously, the open-close mechanism opens the first contacts and the second contacts immediately after the open-close mechanism has detected a short-circuit current. By opening the first contacts and the second contacts when a short-circuit current is caused, the life of the contacts is prolonged, since the arc energy per one contact is reduced by dividing the arc voltage to the first and second contacts.

Advantageously, the electromagnet includes a control circuit, and the electromagnet opens the second contact by breaking the control circuit. Advantageously, the electromagnet may open the second contact in mechanical linkage with the make break mechanism. In this occasion, by simultaneously opening the control circuit of the electromagnet, the second contacts are securely opened, and the disconnection after the trip operation is secured.

Preferably, the open-close mechanism opens the first contacts and the second contacts after a predetermined period of time has passed since the make break mechanism detected an overcurrent caused by over load. By simultaneously opening the first contacts and the second contacts when the open-close mechanism has detected the overload current less than the instantaneous trip current value, the life of the contacts is prolonged. Even when the contacts are used under the heavier duty, such as closing the circuit at a current 6 times as high as the rated current and interrupting a current 6 times as high as the rated current, heavier than the normal duty in the motor drive of closing the circuit, the life of the contacts can be prolonged.

Advantageously, the circuit breaker further includes intermediate taps disposed on the insulative container, each of the intermediate taps being disposed for one of the phases between the first contact and the second contact. By connecting electromagnetic contactors to the intermediate taps, the first contacts may be provided with multiple sets of the second contacts.

Advantageously, the circuit breaker further includes insulative holders for holding movable contacts of the first and second contacts. The holders are rotatably supported on the insulative container to be rotatable around a common axis thereof. By this structure, the space between the holders is reduced and a compact circuit breaker is obtained.

Advantageously, the circuit breaker further includes arc quenching rooms for the first contacts and the second contacts, an arc quenching space linking the arc quenching rooms, and a commutation plate disposed in the arc quenching space, the commutation plate bridging the arc quenching rooms. By this structure, the mutual arc quenching spaces are widened, and the arc quenching capability is improved. By commutating the arc current from the normal current path to the commutation plate, the conductor parts in the current path are protected from damages caused by an excessive current.

According to another aspect of the invention, there is provided a circuit breaker, which includes current paths, each being disposed for one of the phases and having two contacts; an open-close mechanism disposed in common to the two contacts; an overcurrent trip device for detecting an overcurrent in the current paths, the overcurrent trip device providing a trip signal to the open-close mechanism; and an insulative container for housing therein the current paths with the contacts, the open-close mechanism and the overcurrent trip device. The open-close mechanism includes two transmission portions for opening and closing the contacts, and a driving portion for providing an operating force to the transmission portions. The driving portion is selectively connectable to at least one of the transmission portions. Advantageously, the driving portion may be connectable to both transmission portions.

In the circuit breaker having two contacts for one phase connected in series, the common open-close mechanism disposed commonly for the two contacts reduces the space for the open-close mechanism as compared with the open-close mechanisms, each being disposed for each contact. By dividing the common open-close mechanism to a driving portion that generates the switching force and transmission potions which transmit the switching force to the contacts and by selectively connecting the driving portion to either one of the contacts to open the selected contact depending on the value of the current to be interrupted, the contact life of the other contact is prolonged.

DETAILED DESCRIPTION OF PREFERRED EMBODIMENTS

Figure 1:
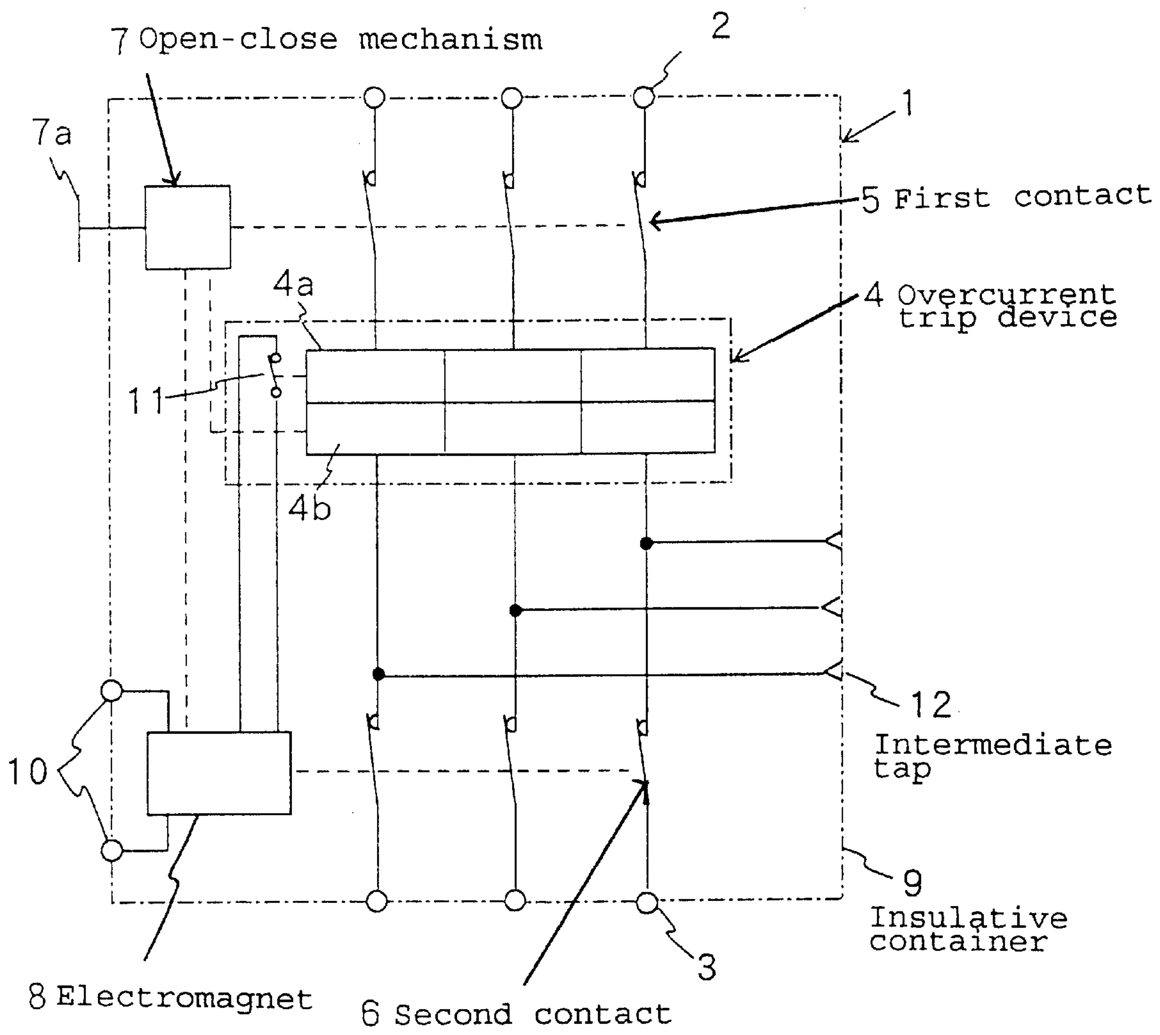
FIG. 1 is an internal connection diagram of a first embodiment of a three-phase circuit breaker according to the invention.

FIG. 1 is an internal connection diagram of a first embodiment of a three-phase circuit breaker according to the invention. Referring now to FIG. 1, a first contact 5 and a second contact 6 are arranged in series with a thermal-drive electromagnetic type overcurrent trip device 4 interposed in-between in each current path for each phase between a power supply side terminal 2 and a load side terminal 3. The trip device 4, first contacts 5 and second contacts 6 are mounted integrally with a break mechanism or open close mechanism 7 and an electromagnet 8 in an insulative container 9. The first contacts 5 are closed and opened by manually turning a handle 7*a* under the state that the break mechanism 7 is reset. The second contacts 6 are closed when the electromagnet 8 is energized by a control signal fed from the outside and opened when the control signal is removed.

When an overload current flows in the current path, a control contact 11, which is formed of a normally-closed contact and inserted in the control circuit of the electromagnet 8, is opened by the action of the time delay portions 4*a* of the overcurrent trip device 4. The second contacts 6 open as the control signal vanishes. When a short-circuit current flows in the current path, a latch (not shown) of the break mechanism 7 is unlocked by the action of the instantaneous trip portions 4*b* of the trip device 4, and the first contacts 5 and the second contacts 6 are simultaneously opened by the release of the energy stored in the open-close spring. In this occasion, since the break mechanism 7 is mechanically linked with the electromagnet 8 through a structure that is not hazardous for the open-close operation of the break mechanism 7 as will be described later, the electromagnet 8 opens the second contacts 6 in linkage with the breaking operation of the break mechanism 7 triggered by the instantaneous trip signal.

In FIG. 1, intermediate taps 12 for external connections are disposed for the respective phases. The intermediate taps 12 are connected in the respective current paths between the trip device 4 and the second contacts 6, i.e. between the first contact 5 and the second contact 6, respectively. The intermediate taps 12 are formed as a plug-in connection structure and arranged on the back surface (installation surface) of the circuit breaker 1.

Figure 2:
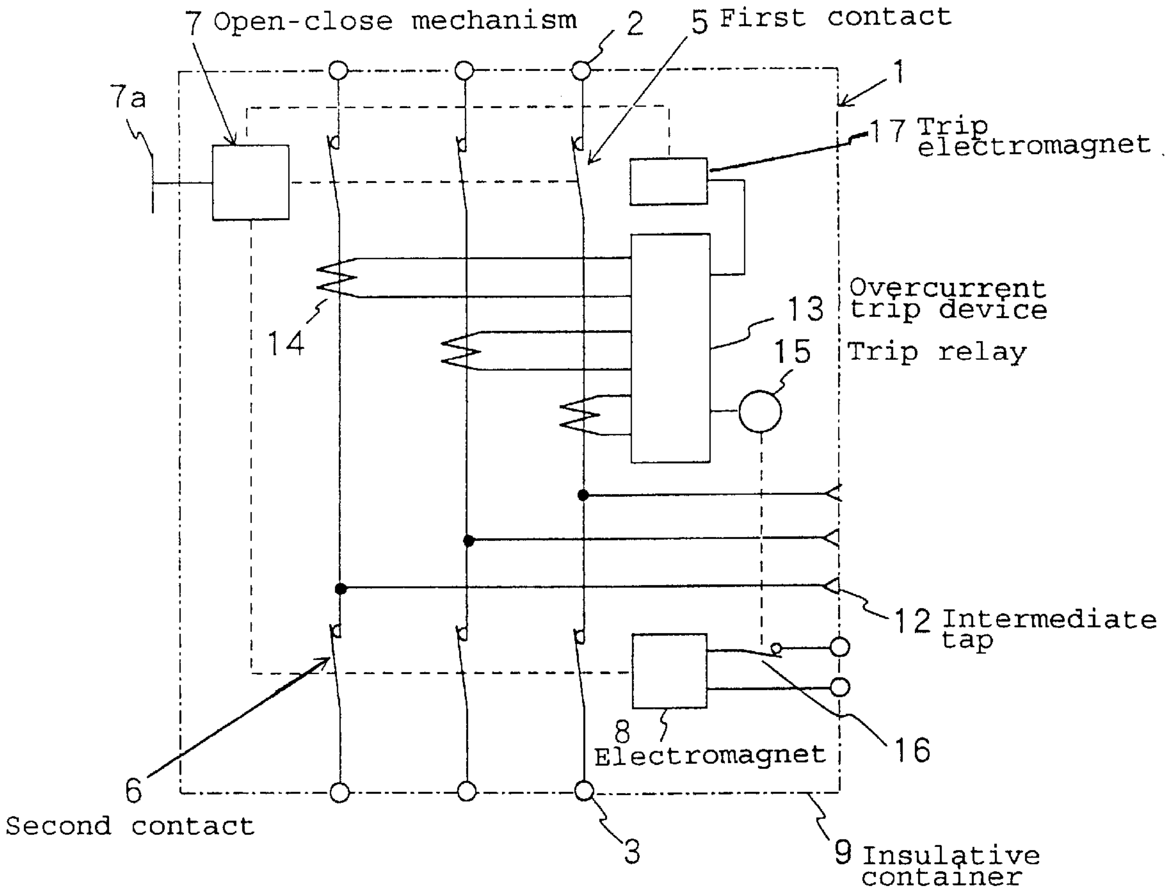
FIG. 2 is an internal connection diagram of a second embodiment of a circuit breaker according to the invention, which includes an electronic overcurrent trip device.

FIG. 2 is an internal connection diagram of a second embodiment of a circuit breaker according to the invention that includes an electronic overcurrent trip device. An overcurrent trip device 13 detects currents flowing in current paths by means of current transformers 14. When overload currents flow in the current paths, the trip device 13 operates a trip relay 15 to open a relay contact 16 inserted in the control circuit of an electromagnet 8. By this operation, the control signal is removed and the second contacts 6 are opened. When short-circuit currents flow in the current paths, the trip device 13 operates a trip electromagnet 17. By the operation of the trip electromagnet 17, the latch of the open-close mechanism 7 is unlocked, and the first contacts 5 and the second contacts 6 are simultaneously opened similarly as in the circuit breaker of FIG. 1.

Figure 3:
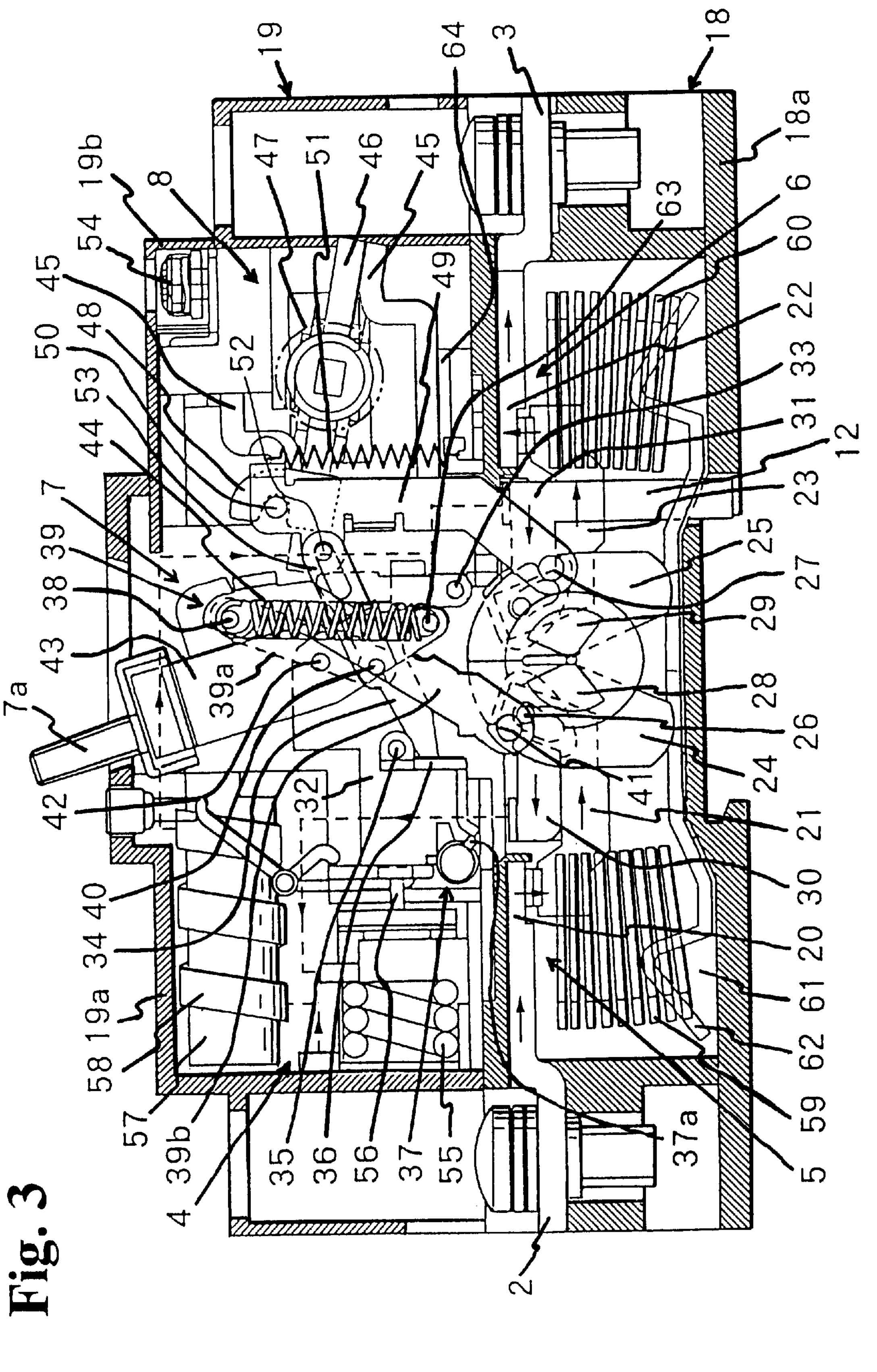
FIG. 3 is a cross sectional view of the circuit breaker of FIG. 1.

FIG. 3 is a cross section of the circuit breaker of FIG. 1. Referring now to FIG. 3, the circuit breaker is integrally constructed in the insulative container 9 consisting of a casing 18 and a cover 19. A bottom plate 18*a* of the casing 18 is detachable. The cover 19 consists of a unit cover 19*a* that works also as a casing for the unit of the overcurrent trip device 4 and a magnet cover 19*b* that works also as a cover of the electromagnet 8. The first contact 5 and the second contact 6 are connected in series to form each current path for each phase. The first contact 5 includes a stationary contact 20 and a movable contact 21. The second contact 6 includes a stationary contact 22 and a movable contact 23. The power supply side terminal 2 is formed integrally with the stationary contact 20. The load side terminal 3 is formed integrally with the stationary contact 22. The terminals 2 and 3 are fixed to the casing 18 by insertion.

The movable contacts 21 and 23 are movably supported through pins 26 and 27 to respective insulative holders 24 and 25, each having a fan-shaped cross section. The movable contacts 21 and 23 are urged toward the respective stationary contacts 20 and 22 by contact springs (not shown). In FIG. 3, the movable contact 21 is urged clockwise and the movable contact 23 is urged counterclockwise. The holders 24 and 25 are formed symmetrically with each other. The holders 24 and 25 are respectively linked integrally in each phase by the respective fan-shaped switching axes 28 and 29. As will be described later, a protrusion is formed on one of the portions corresponding to the pivots of the fan shaped holders 24 and 25, and a recess into which the protrusion is inserted is formed on the other portion. The protrusion and recess of the holders 24 and 25 are coupled such that the holders 24 and 25 are arranged as illustrated in FIG. 3. The holders 24 and 25 are rotatably supported through the outer peripheral surfaces of the switching axes 28 and 29 concentrically around the rotation center to semicircular bearing grooves (not shown) of the casing 18.

Figure 10:
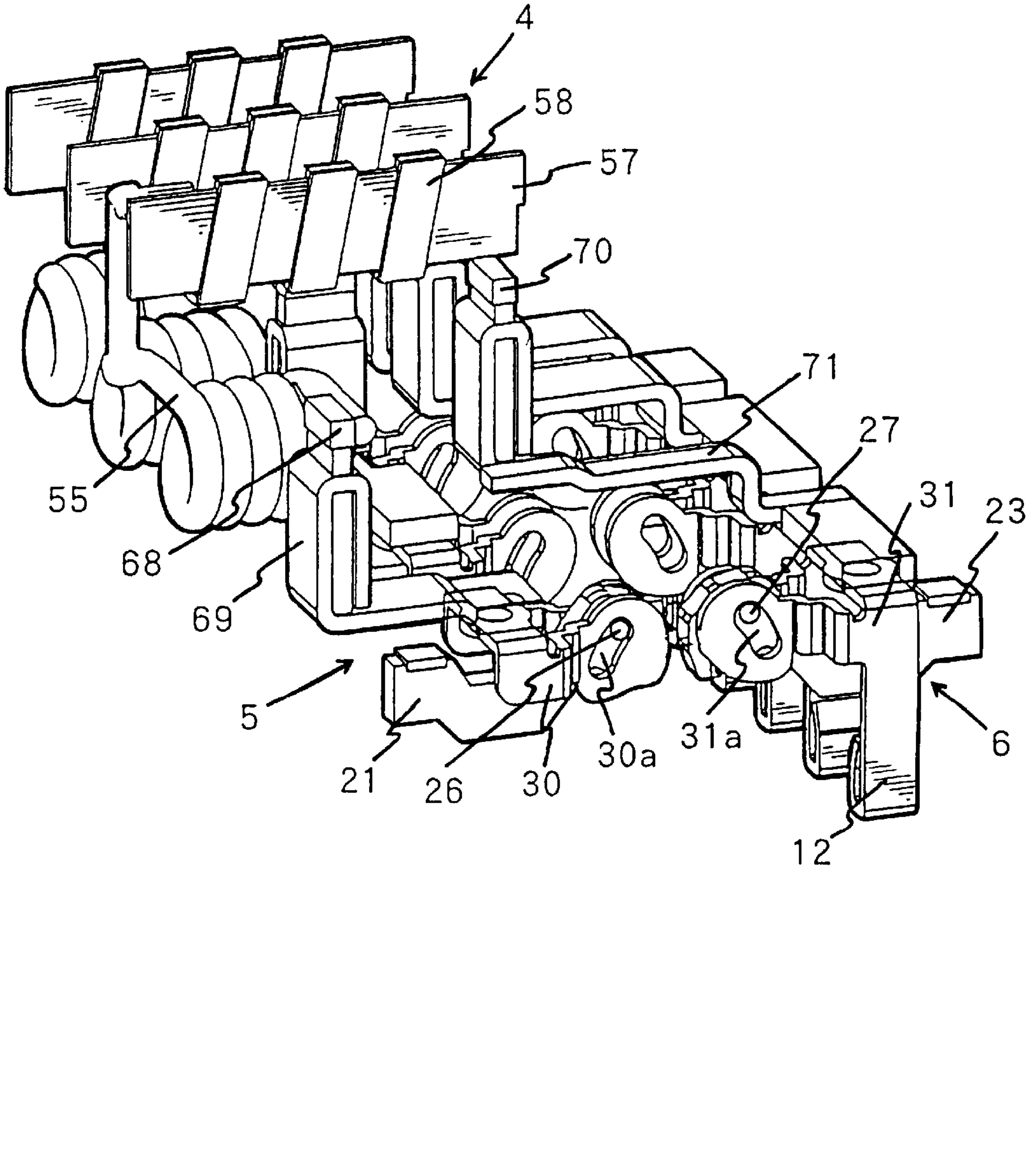
FIG. 10 is a perspective view showing a current path from the movable contact of the first contact to the movable contact of the second contact via the overcurrent trip device.

FIG. 10 is a perspective view showing the current path from the movable contact 21 of the first contact 5 to the movable contact 23 of the second contact 6 via the overcurrent trip device 4. Referring now to FIGS. 3 and 10, the movable contacts 21 and 23 supported by the holders 24 and 25 are electrically connected by sliding contact to connector plates 30 and 31 fixed to the casing 18. As shown in FIG. 10, the connector plates 30 and 31 are bifurcated into two branches which elastically clamp the respective supporting end portions of the movable contacts 21 and 23. The connector plates 30 and 31 are pressed to contact the movable contacts 21 and 23 by compression springs (not shown) inserted between the holders 24 and 25. Referring to FIG. 10, arc-shaped long holes 30*a* and 31*a* are bored in the connector plates 30 and 31 at the contact portions with the movable contacts 21 and 23 such that the holes 30*a* and 31*a* can avoid the trajectories of the pins 26 and 27 by movement of the holders 24 and 25.

Referring to FIG. 3, the intermediate tap 12 is arranged outwardly from the bottom of the casing 18. As shown in FIG. 10, the intermediate tap 12 is shaped like a clip integral with the connector plate 31 on the side of the second contact 6. The intermediate tap 12 is connected with an external connection terminal by plug-in connection.

Figure 4:
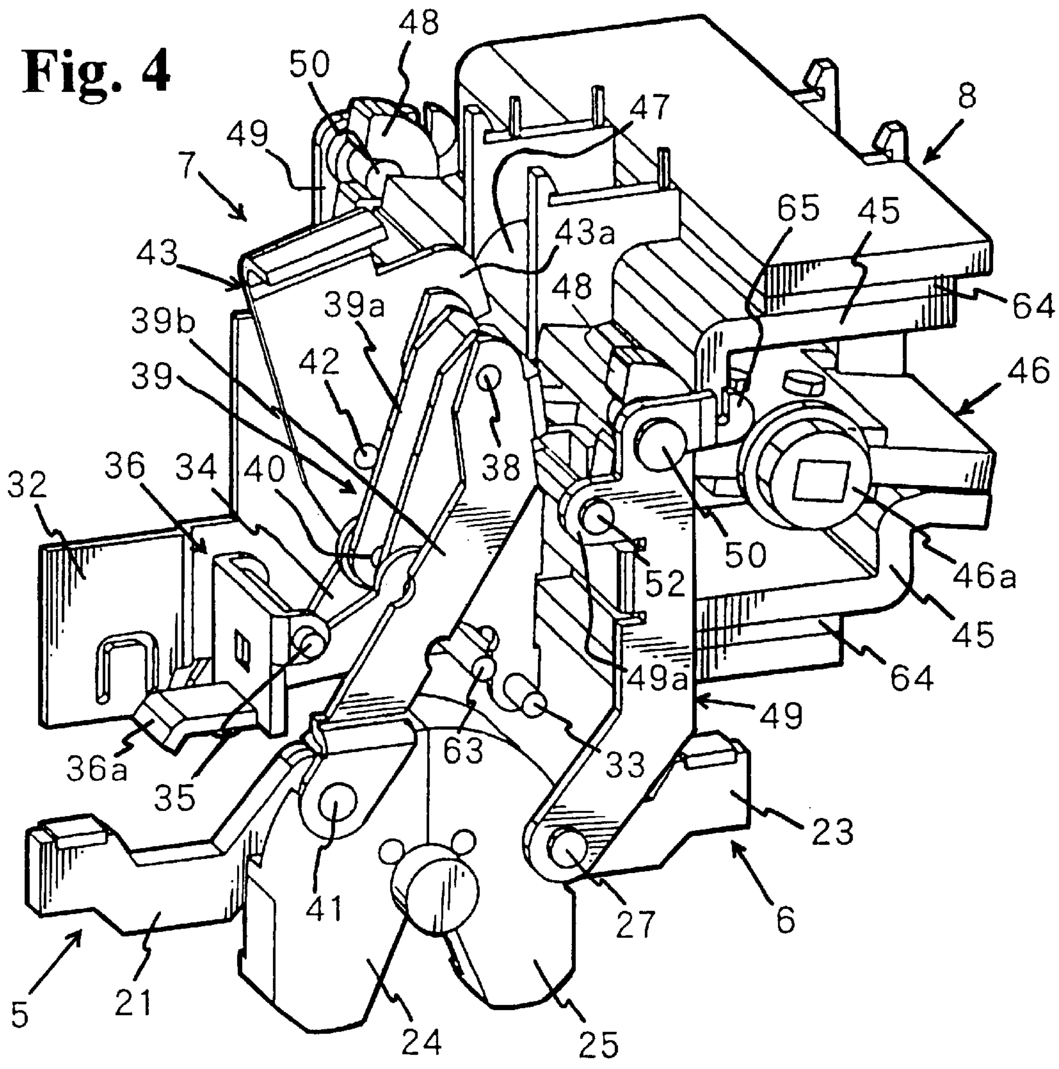
FIG. 4 is a perspective view showing the on-state of the open-close mechanism and the electromagnet.
Figure 5:
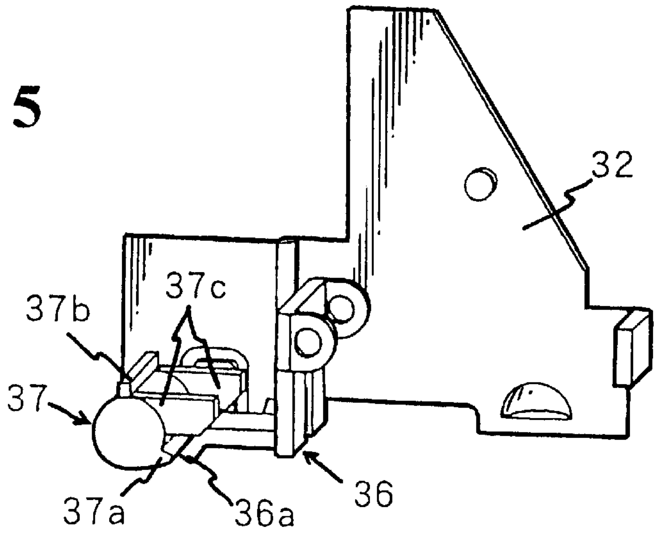
FIG. 5 is a perspective view of a trip cross bar.

FIG. 4 is a perspective view showing the on-states of the open-close mechanism 7 and the electromagnet 8. FIG. 5 is a perspective view of the trip cross bar. Referring now to FIGS. 3, 4 and 5, the movable contact 21 of the first contact 5 is opened and closed by manually operating the open-close mechanism 7. The movable contact 23 of the second contact 6 is opened and closed by the remote control of the electromagnet 8. The structure and operation of the open-close mechanism 7 will be described below. The open-close mechanism 7 includes a V-shaped latch 34, an L-shaped latch hold 36, a trip cross bar 37, a toggle link 39, a handle lever 43 and an open-close spring 44. The latch 34 is rotatably supported with a pin 33 to a flame 32 consisting of two side plates (one side plate is shown in FIGS. 4 and 5) fixed to the casing 18. The latch hold 36, rotatably supported with a pin 35 to the flame 32, holds an end of the latch 34. The trip cross bar 37 (FIGS. 3 and 5), rotatably supported to the overcurrent trip device 4, includes a nail 37*a* that holds an end 36*a* of the latch hold 36. The toggle link 39 includes a first link 39*a* and a second link 39*b* linked to each other. The first link 39*a* is linked by a pin 40 to the latch 34. The second link 39*b* is linked by a pin 41 to the holder 24 of the movable contact 21. The handle lever 43 is rotatably supported with a pin 42 to the flame 32, and the handle 7*a* is mounted on the head of the handle lever 43 (FIG. 3).

The open-close spring 44 includes an extension spring including an end hung on a pin 63 disposed at an end of the handle lever 43 and the other end hung on a pin 38 of the toggle link 39 (FIG. 3). As shown in FIG. 4, the latch 34, the first link 39*a*, the second link 39*b* and the handle lever 43 are bifurcated into two to have two arms respectively. In FIG. 4, a half of the handle lever 43 is shown.

Figure 6:
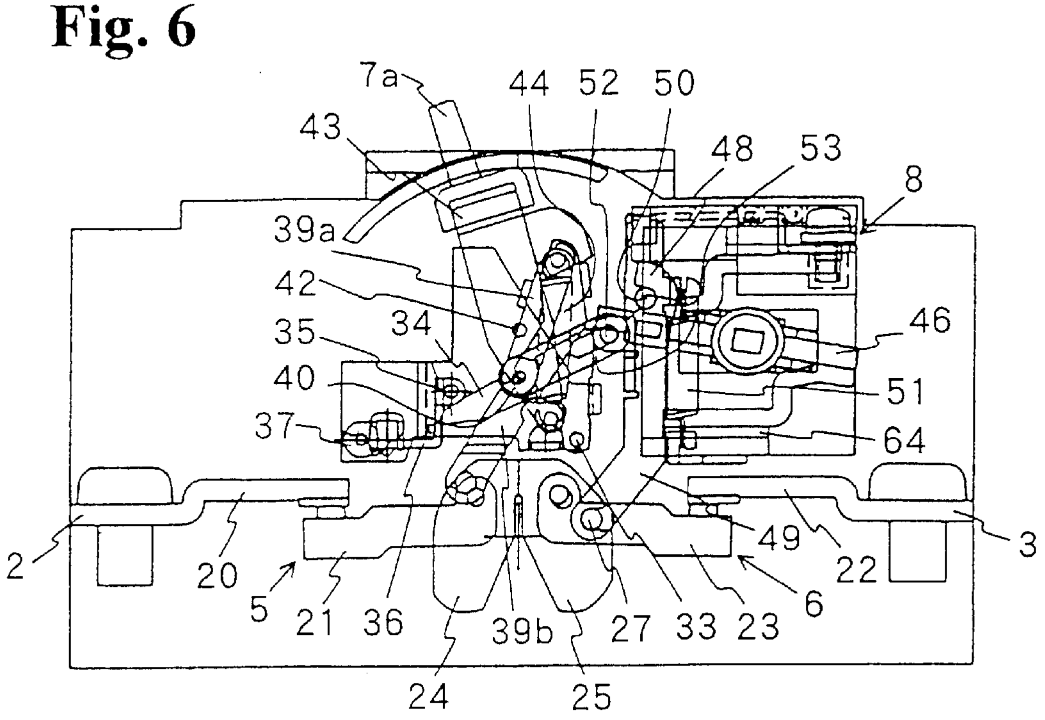
FIG. 6 is an explanatory side view illustrating the ON-state of the circuit breaker of the invention.
Figure 7:
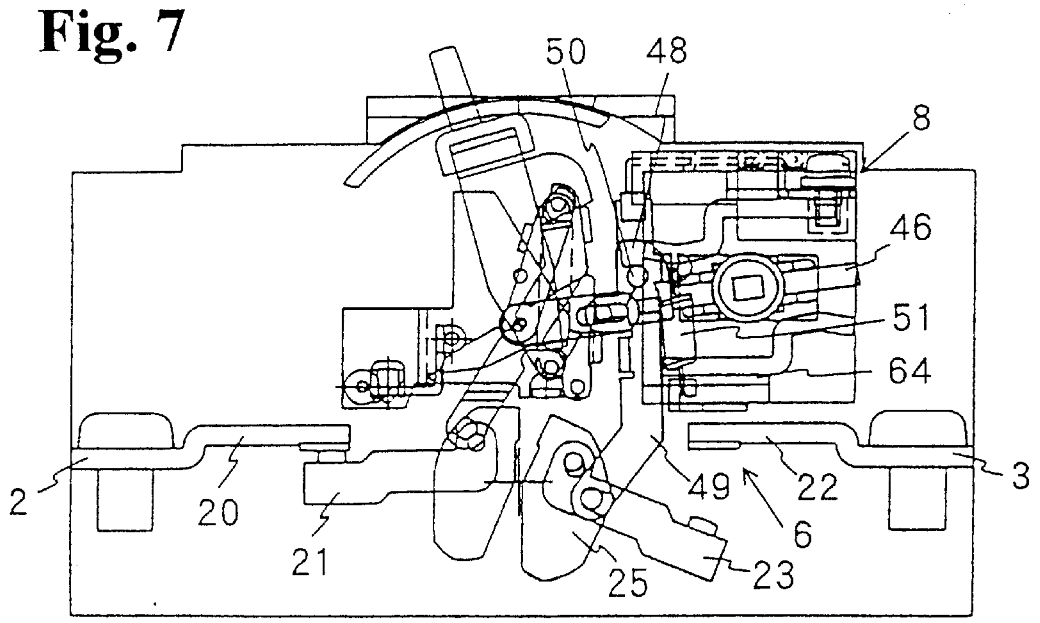
FIG. 7 is an explanatory side view illustrating a first contact in the ON-state and a second contact in the OFF-state.
Figure 8:
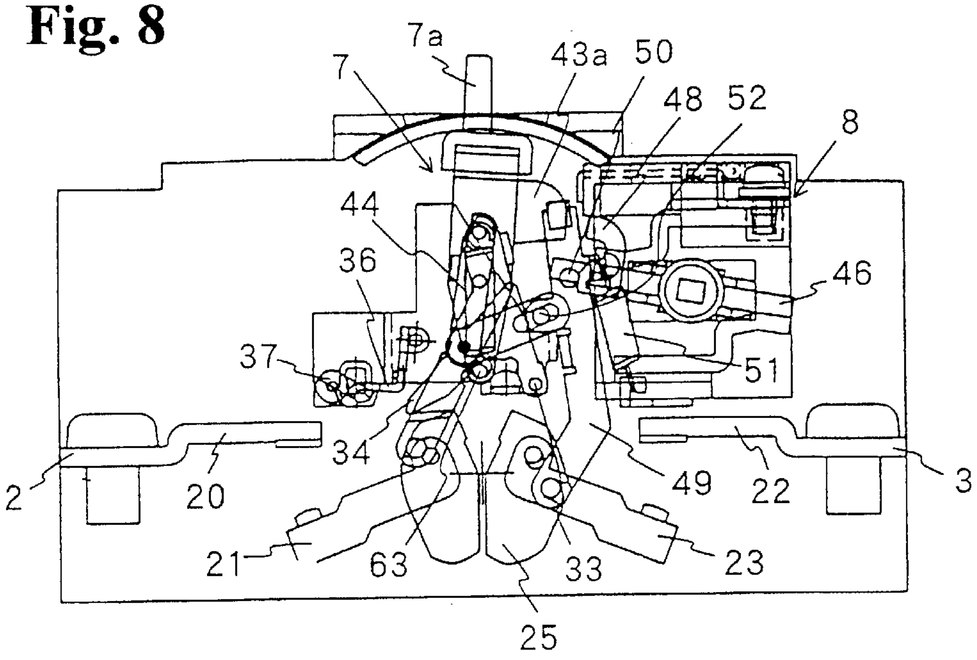
FIG. 8 is an explanatory side view illustrating an instantaneous trip state of the circuit breaker of the invention.
Figure 9:
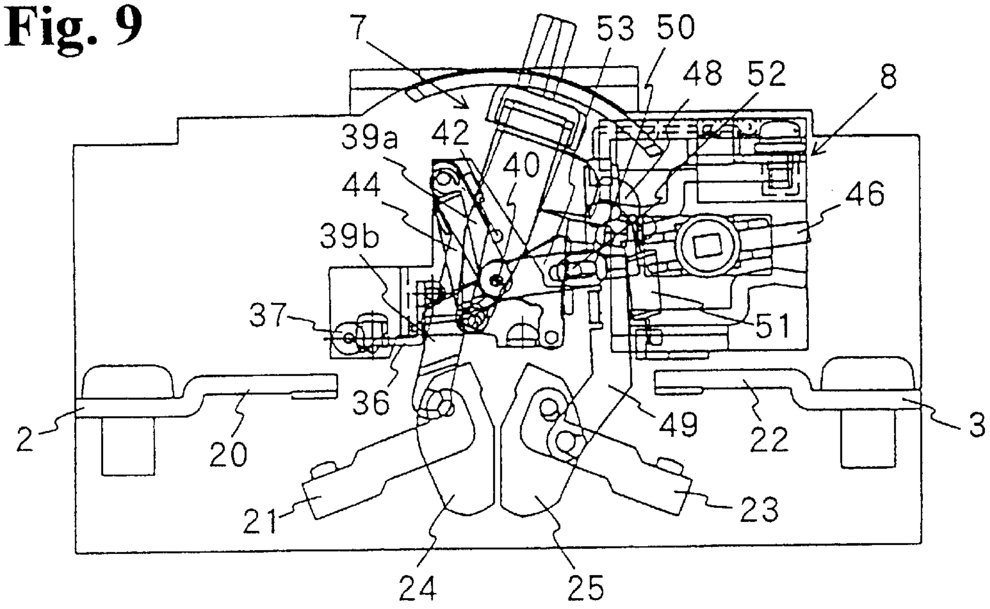
FIG. 9. is an explanatory side view illustrating the reset state of the circuit breaker of the invention.

FIG. 6 is a side view illustrating the on-state of the circuit breaker of the invention. FIG. 7 is a side view illustrating the first contact in the on-state thereof and the second contact in the off-state thereof. FIG. 8 is a side view illustrating the instantaneous trip state of the circuit breaker of the invention. FIG. 9. is a side view illustrating the off/reset state of the circuit breaker of the invention.

Referring now to FIGS. 3, 4 and 6, the open-close spring 44 is energized, i.e. extended to store the energy, in the on-state. The handle lever 43, receiving counterclockwise rotational force around the pivotal pin 42, is held at the illustrated on-position. The first link 39*a* of the toggle link 39, receiving clockwise rotational force around the pivotal pin 40, exerts clockwise rotational force to the holder 24 via the second link 39*b* to press the movable contact 21 to the stationary contact 20. The latch 34, receiving counterclockwise rotational force around the pivotal pin 40 from the open-close spring 44 via the first link 39*a*, is prevented from rotating at the end thereof held by the latch hold 36. Although the latch hold 36, a coupling slope (not shown) on the back of which is pushed by the latch 34, receives clockwise rotational force around the pivotal pin 40, the latch hold 36 is prevented from rotating by the end 36*a* thereof held by the nail 37*a* of the trip crossbar 37 (FIG. 3).

By turning the handle 7*a* to the right from the on-state of FIG. 6, which rotates the handle lever clockwise around the pivotal pin 42, the action of the open-close spring 44 to the first link 39*a* is inverted beyond the point at which the center line of the open-close spring 44 passes the center line of the first link 39*a* from right to left in the figure. Due to this action, the first link 39*a* rotates counterclockwise around the pin 40 and rotates the holder 24 counterclockwise via the second link 39*b*. By this operation, the movable contact 21 leaves the stationary contact 22 (off-operation). FIG. 9 shows this off-state. By turning the handle 7*a* to the left from the Off-state of FIG. 9, the circuit breaker returns to the state shown in FIG. 6 through the process reverse to the foregoing off-operation process (on-operation).

Figure 11:
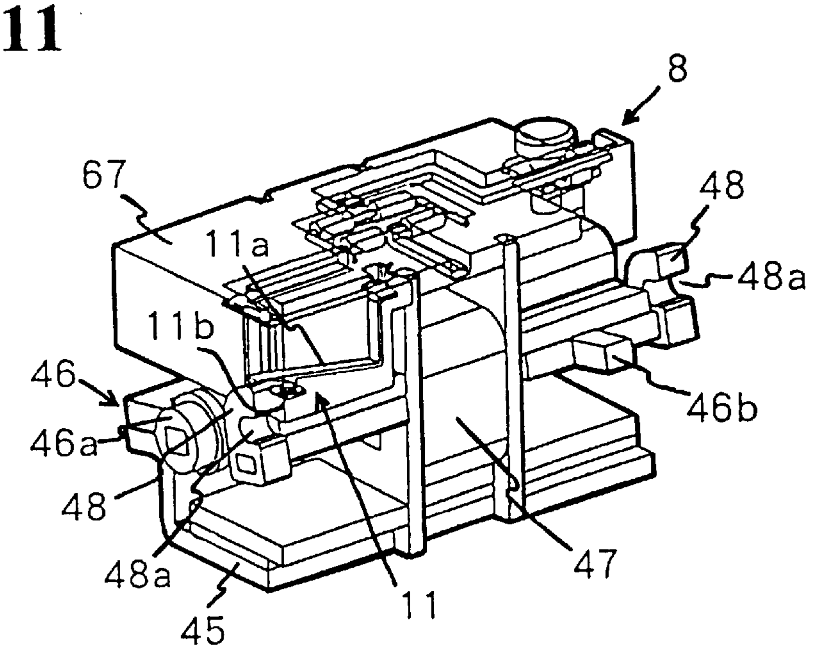
FIG. 11 is a perspective view of the electromagnet.
Figure 12:
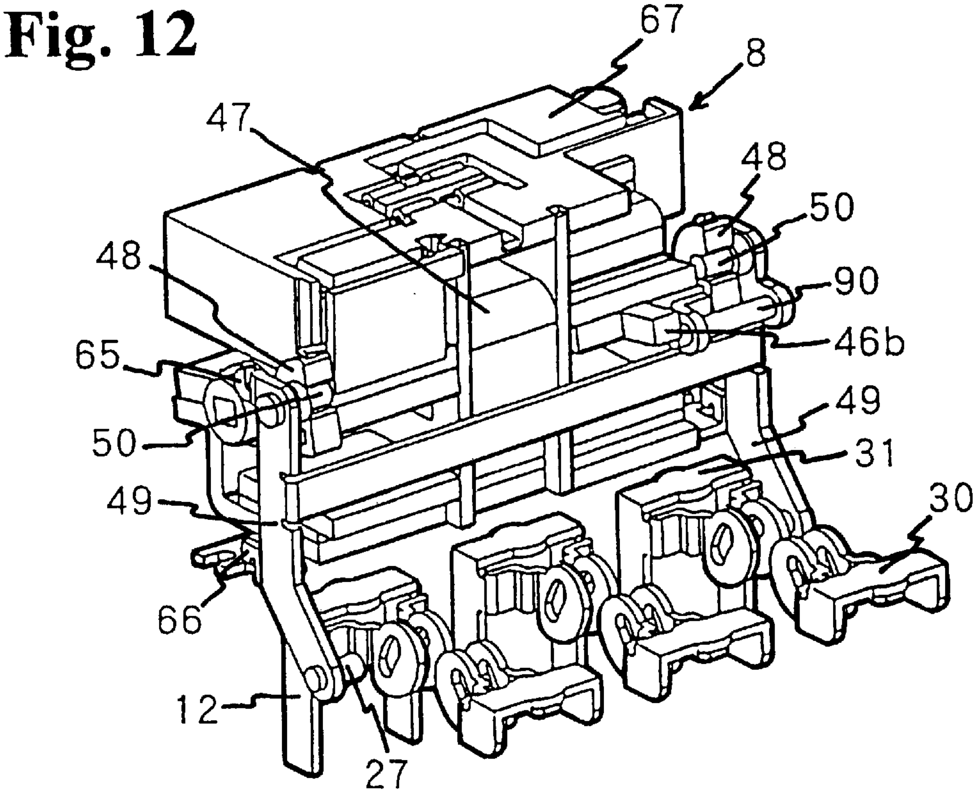
FIG. 12 is a perspective view of the electromagnet to which the operating link is connected.
Figure 13:
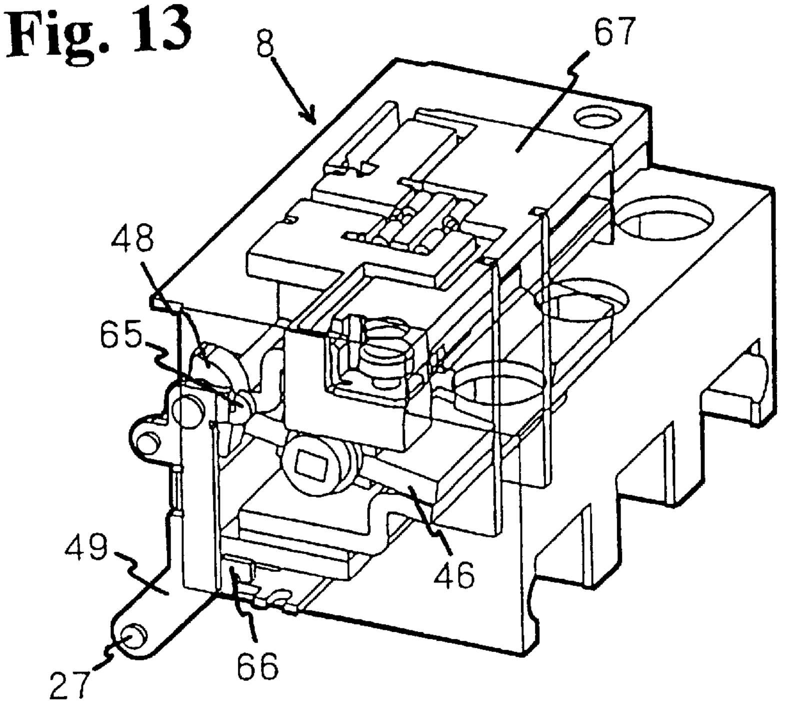
FIG. 13 is a perspective view of the electromagnet and the operating link looked from the other side of FIG. 12.
Figure 14:
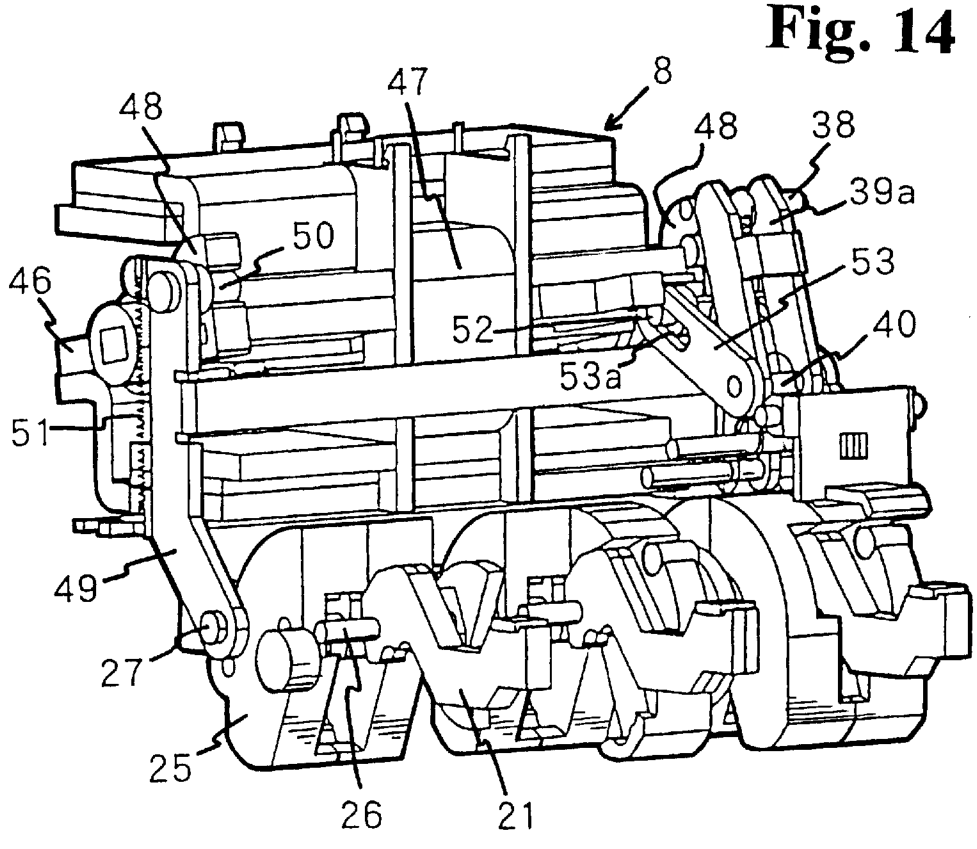
FIG. 14 is a perspective view of the operating link of FIG. 12 connected to a holder of the second contact.

FIG. 11 is a perspective view of the electromagnet 8. FIG. 12 is a perspective view of the electromagnet 8, to which operating links described later are connected. FIG. 13 is a perspective view of the electromagnet 8 and the operating link looked from the other side of FIG. 12. FIG. 14 is a perspective view of the operating link of FIG. 12 connected to the holder 25 of the second contact 6.

Referring now to FIGS. 3, 4 and 11 through 14, especially referring to FIG. 4, the electromagnet 8 includes a monostable-type polar electromagnet including a pair of yokes 45, an armature 46 rotatably supported to the casing 18 of the circuit breaker via rotating plates 46*a* at both ends thereof, and an electromagnetic coil 47 arranged around a rotation axis of the armature 46. Permanent magnets 64 are arranged outside and in close contact with the yokes 45.

Hooks 48 are fixed to the respective ends of the armature 46. The hook 48 includes a U-shaped groove 48*a*, to which a pin 50 fixed on each of the upper ends of a pair of operating links 49 is inserted (FIG. 12). The lower end of the operating pin 49 is linked via the link 27 to the holder 25 that holds the movable contact 23. A return spring 51 (FIG. 3) consisting of a contraction spring extends between a spring hook 65 on the upper end of the operating link 49 and a spring hook 66 (FIG. 13) fixed on the electromagnet 8. The pin 50 is held in the U-shaped groove 48*a*. Rotational force is exerted counterclockwise in FIG. 3 to the armature 46 due to the above described structure. An upper end portion 49*a* of the operating link 49 (FIG. 4) is extended toward the open-close mechanism 7. An end of a trip link 53 (FIGS. 3 and 14) is coupled to a pin 52 fixed on the upper end portion 49*a* through a long hole 53*a* (FIG. 14) and the other end of the trip link 53 is linked together with the first link 39*a* to the latch 34 by the pin 40.

The electromagnetic coil 47 is connected to a control circuit in a control box 67 (FIG. 11). In the state illustrated in FIG. 3, an operating signal (voltage) is fed from outside to the control circuit via a coil terminal 54. The armature 46 is attracted, as illustrated in FIG. 3, to the yoke 45 against the return spring 51 due to the magnetic fluxes of the electromagnetic coil 47 and the permanent magnet 64. The holder 25, to which a counterclockwise rotational force is exerted via the operating link 49, presses the movable contact 23 to the stationary contact 22. The monostable-type polar magnet is described in detail in Japanese Unexamined Laid Open Patent Application No. H07-284262. When the operating signal is interrupted in the illustrated state of FIG. 3, the spring force of the return spring 51 exceeds the attractive force of the permanent magnet 64 and the armature 46 is driven counterclockwise by the return spring 51. By the counterclockwise movement of the armature 46, the holder 25 is rotated clockwise via the operating link 49 and the movable contact 23 leaves the stationary contact 22 as illustrated in FIG. 7 (off-operation).

Figure 15:
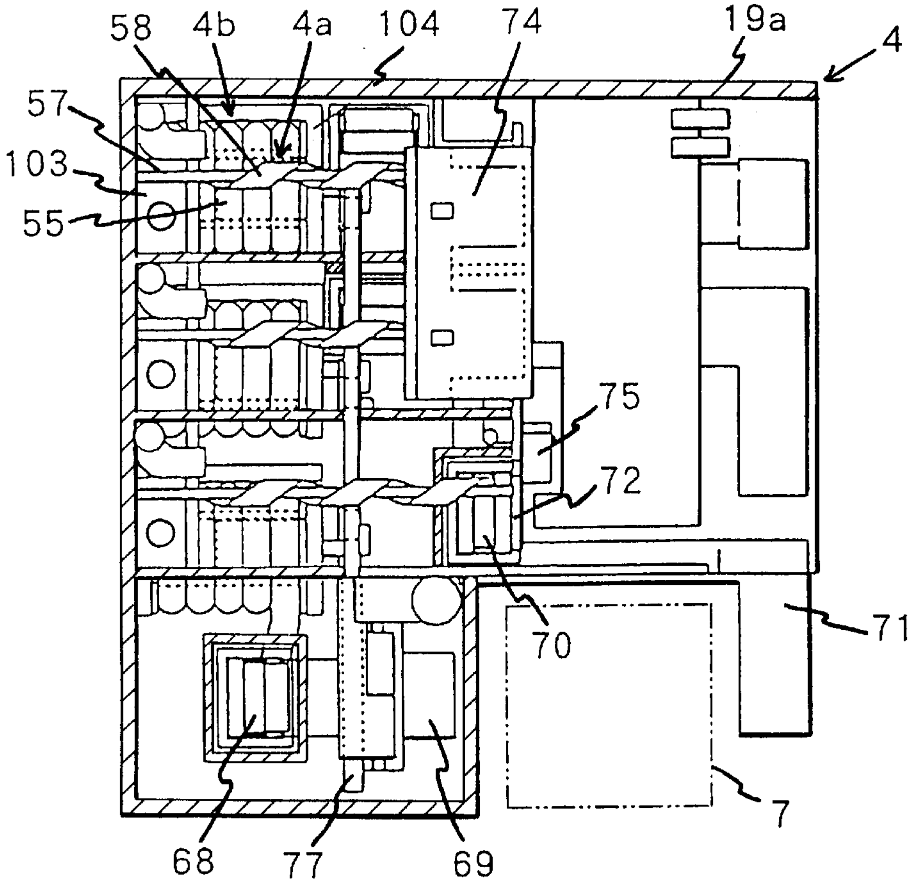
FIG. 15 is a top plan view of the overcurrent trip device.
Figure 16:
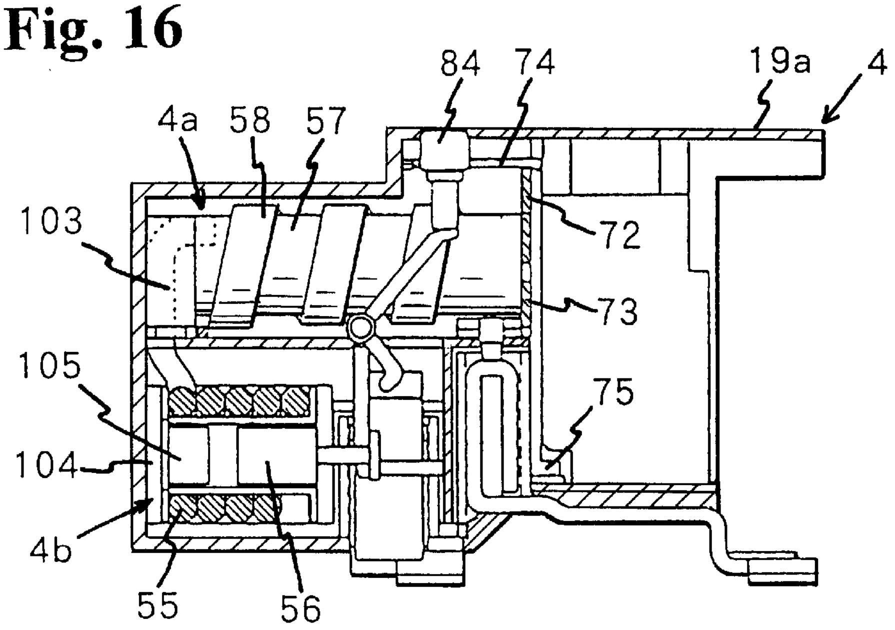
FIG. 16 is a side view of the overcurrent trip device.
Figure 17:
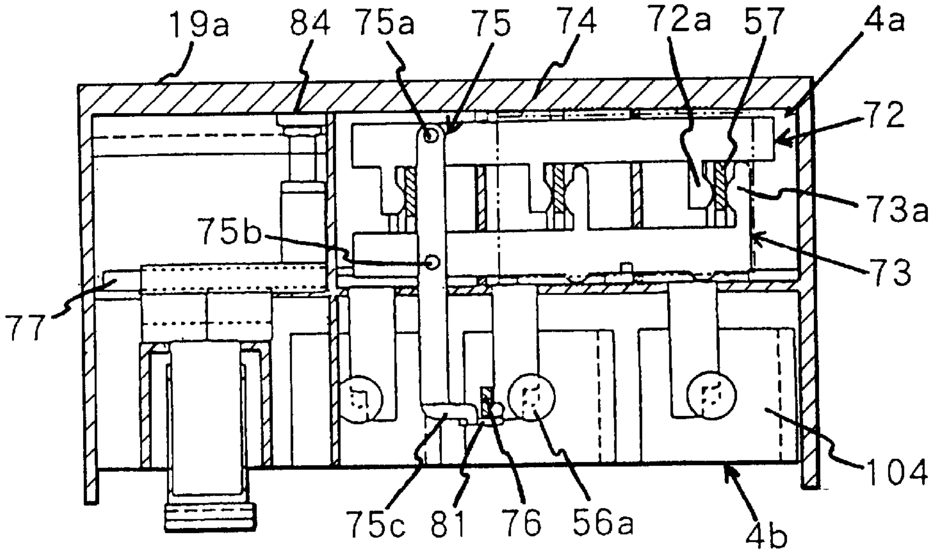
FIG. 17 is a front view of the overcurrent trip device.

FIG. 15 is a top plan view of the overcurrent trip device. FIG. 16 is a side view of the overcurrent trip device. FIG. 17 is a front view of the overcurrent trip device. Referring now to FIGS. 3 and 15 through 17, the overcurrent trip device 4 is covered as a unit by the unit cover 19*a* of the circuit breaker. The overcurrent trip device 4 is detachably mounted on the casing 18. The overcurrent trip device 4 includes the time delay trip portion 4*a* having a thermal trip mechanism, and the instantaneous trip portion 4*b* having an electromagnetic trip mechanism. The thermal trip mechanism of the time delay trip portion 4*a* includes a bimetal 57 with an end thereof fixedly mounted (cantilever mount) on an L-shaped bimetal support 103 and a heater 58 wound around the bimetal 57. The electromagnetic trip mechanism of the instantaneous trip portion 4*b* includes a C-shaped yoke 104, a trip coil 55 held inside the C-shaped yoke 104, a stationary core 105 fixed inside the trip coil 55 and fixed to the yoke 104, and a slidable plunger 56 facing opposite to the stationary core 105. The plunger 56 is energized by a return spring (not shown) and held at the illustrated position in FIG. 16 apart from the stationary core 105.

As shown in FIG. 10, an end of the trip coil 55 is connected to the connector plate 30 via a plug terminal 68 and a relay conductor 69, and the other end of the trip coil 55 is connected to an end the heater 58. The other end of the heater 58 is connected to a connector plate 31 via a plug terminal 70 and a relay conductor 71. The relay conductors 69 and 71 are L-shaped. In FIG. 10, the horizontal arms of the relay conductors 69 and 71 are clamped to the conductor plates 30 and 31 respectively with screws (not shown). The vertical arms of the relay conductors 69 and 71 are bent in a U-shape, and holes through which the plug terminals 68 and 70 are inserted respectively are bored in the bent portions of the vertical arms. The plug terminals 68 and 70 are shaped in a rectangular form with the upper ends thereof welded to the trip coil 55 and the heater 58 respectively and with the lower ends thereof detachably inserted into the bent portions of the relay conductors 69 and 71 respectively. The open-close mechanism 7 is positioned with respect to the overcurrent trip device 4 in the location shown by the double dotted chain line in FIG. 15.

Referring now to FIGS. 3 and 10, a current flows from the power supply side terminal 2 to the load side terminal 3 via the stationary contact 20, movable contact 21, connector plate 30, relay conductor 69, plug terminal 68, trip coil 55, heater 58, plug terminal 70, relay conductor 71, connector plate 31, movable contact 23 and stationary contact 22 as indicated by broken line arrows in FIG. 3. When overload is caused while the current is flowing through the above described path, the control contact 11 (FIG. 1) is operated by the bending of the bimetal 57 heated by Joule heat caused by the current flowing through the heater 58, the control circuit of the electromagnetic coil 47 is opened to release the armature 46 from the attracted state thereof and the second contact 6 is opened by the spring action of the return spring 51. Since the pin 52 moves freely in the long hole 53*a* of the trip link 53 (FIG. 14) while the operating link 49 is rotating the trip link 53 around the pivotal pin 40, the movement of the operating link 49 is not prevented by the trip link 53.

The time delay trip action described above will be explained more in detail with reference to FIGS. 15 through 17. Two differential shifters 72 and 73 are arranged one above the other in the vicinity of the top end of the bimetal 57 and supported slidably in the lateral direction in FIG. 17 by a shifter support 74. Saw-tooth like contact portions 72*a* and 73*a*, protruding from the differential shifters 72 and 73, contact with respective side faces of the top end portion of the bimetal 57.

Figure 24:
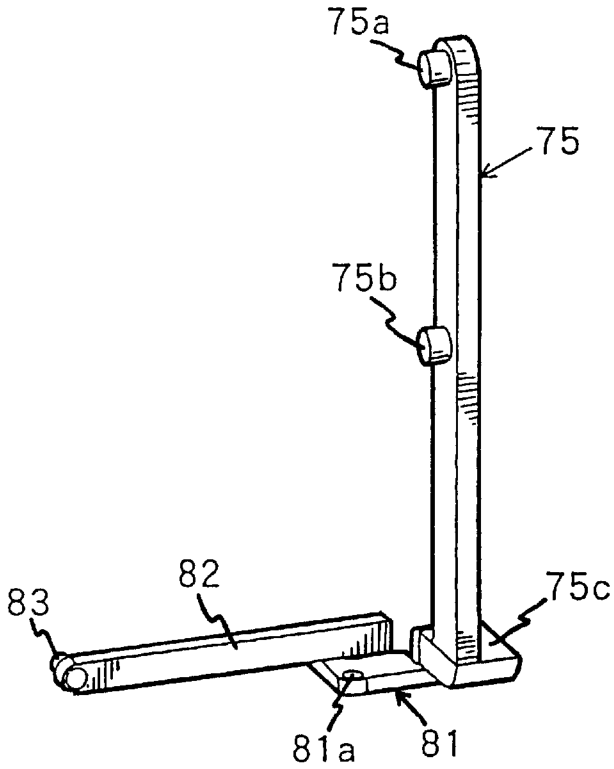
FIG. 24 is a perspective view of a shifter drive plate and an instantaneous interlock plate of FIG. 18.
Figure 25:
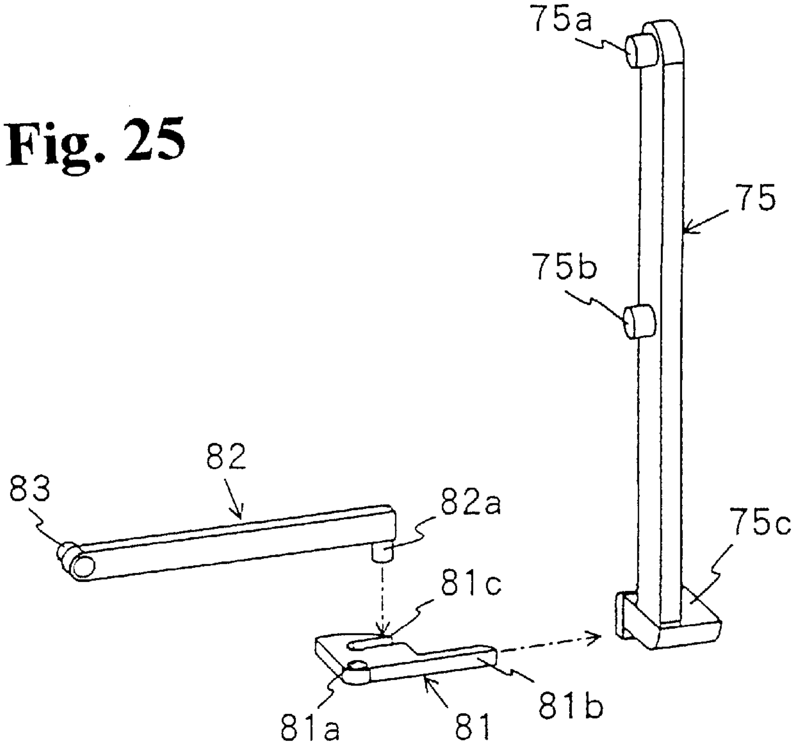
FIG. 25 is an exploded perspective view of the shifter drive plate and the instantaneous interlock plate of FIG. 24.

FIG. 24 is a perspective view of a shifter drive plate 75, and FIG. 25 is an exploded view of FIG. 24. The differential shifters 72 and 73 are linked respectively to protruding axes 75*a* and 75*b* of the shifter drive plate 75 shaped as illustrated in FIGS. 24 and 25. An operating portion 75*c* is disposed at the lower end of the shifter drive plate 75. An end of a contact operating mechanism 76 for operating the control contact 11 faces the operating portion 75*c* with a certain spacing left in-between. In FIG. 11, the control contact 11 is disposed inside the control box 67. The control contact 11 includes a movable contact 11*a* and a stationary contact 11*b*. Although not illustrated in detail, the movable contact 11*a*, normally contacting with the stationary contact 11*b*, leaves the stationary contact 11*b* by the operation of the contact operating mechanism 76.

When a current flows in the current path of the circuit breaker including the heater 58, the top end of the bimetal 57 heated by the heater 58 bends to the right hand side of FIG. 17. By the bending of the bimetal 57, the differential shifter 73 is pushed to the right hand side. In response to this, the shifter drive plate 75 and differential shifter 72 also move to the right hand side while keeping the orientations illustrated in FIG. 17. The shifter drive plate 75 stops moving before the operating portion 75*c* contacts the contact operating mechanism 76 when the current is smaller than the rated value. When the current exceeds the rated value, the shifter drive plate 75 pushes the contact operating mechanism 76 to the right hand side of FIG. 17. As a result, the control contact 11 is opened and the second contact 6 is opened as described before. The differential shifter 72 is disposed for opening the control contact 11 when a phase interruption is caused, which operates in a shorter period of time than that operated when three-phase overload is caused. When any one of the phases is interrupted, the bimetal 57 for the interrupted phase does not bend. Since the differential shifter 72 is prevented from moving by the bimetal 57 for the interrupted phase even when the differential shifter 73 moves to the right, the shifter drive plate 75 rotates counterclockwise in FIG. 17 around the pivotal protruding axis 75*a*. Since the displacement of the shifter drive plate 75 is expanded by the ratio of the arm length between the protruding axes 75*a* and 75*b* and the arm length between the protruding axis 75*a* and the operating portion 75*c*, the control contact 11 is opened in a short period of time than that operated when the ordinary overload is caused.

In FIG. 3, when a high current, such as a short-circuit current, flows through the current path, the instantaneous trip portion 4*b* instantaneously attracts the plunger 56 to the left hand side of FIG. 3 and rotates the trip cross bar 37 clockwise via the link mechanism. By these actions, the latch hold 36 leaves the nail 37*a* and rotates clockwise. And, the latch 34 leaves the latch hold 36 and rotates counterclockwise by the spring force of the open-close spring 44. In association with this, the toggle link 39 moves downward and the holder 24 rotates counterclockwise to open the first contact 5. While the latch 34 is rotating, the operating link 49 is attracted counterclockwise through the trip link 53, the pin 50 comes out from the U-shaped groove 48*a* of the hook 48. The operating link 49 moves downward by the spring force of the return spring 51 and the holder 25 rotates clockwise to open also the second contact 6 as shown in FIG. 8. The foregoing is a brief description of the instantaneous trip action. The handle lever 43 rotates clockwise around the pivotal pin 42 while the toggle link 39 is moving downward, and the operating handle 7*a* moves to the intermediate position between the on-position and the off-position to indicate the trip.

Figure 18:
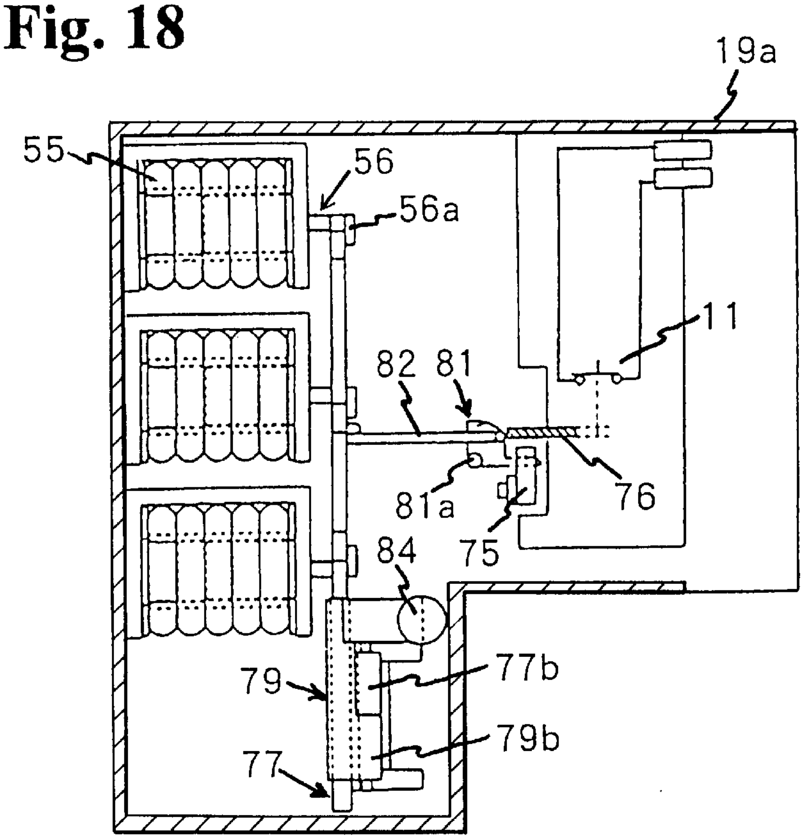
FIG. 18 is a top plan view of the overcurrent trip device shown in FIG. 15, from which a time delay trip portion is omitted.
Figure 19:
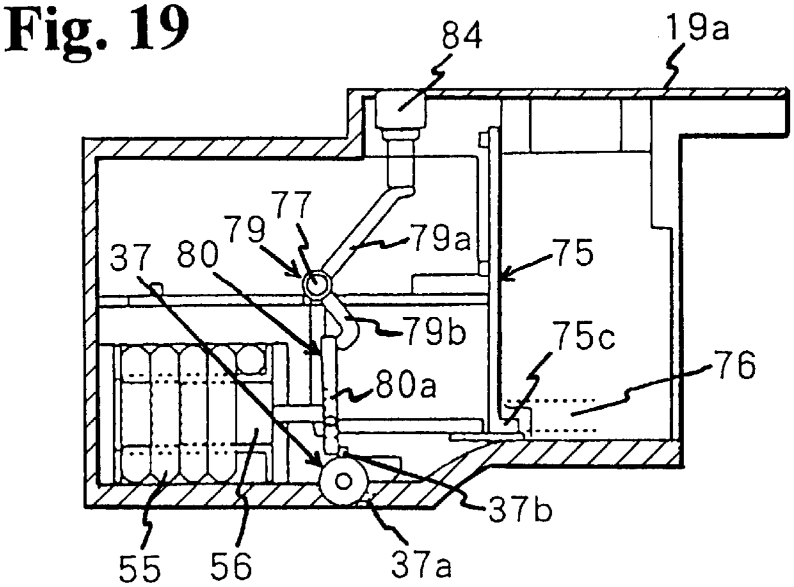
FIG. 19 is a side view of the overcurrent trip device of FIG. 18.
Figure 20:
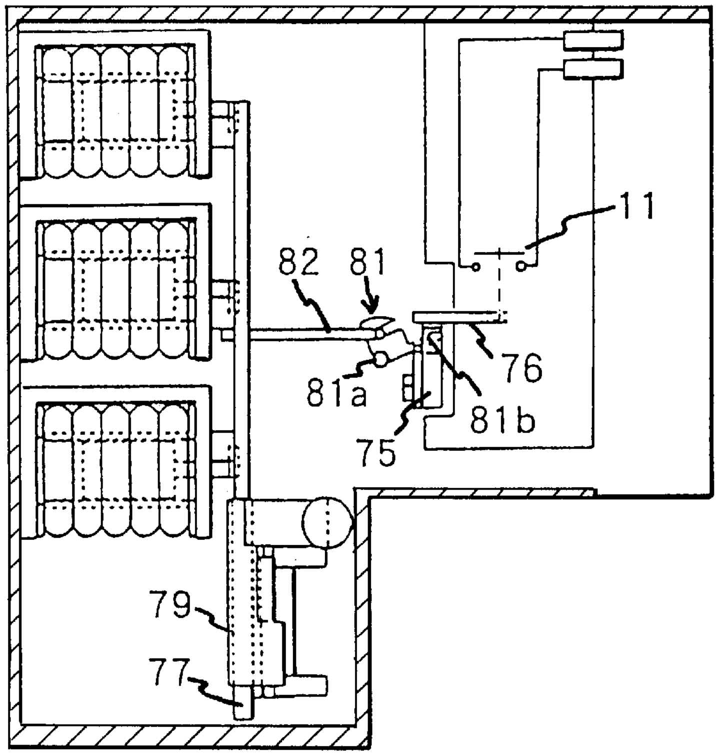
FIG. 20 is a top plan view of the overcurrent trip device shown in FIG. 18 in a condition that the overcurrent trip device is actuated.
Figure 21:
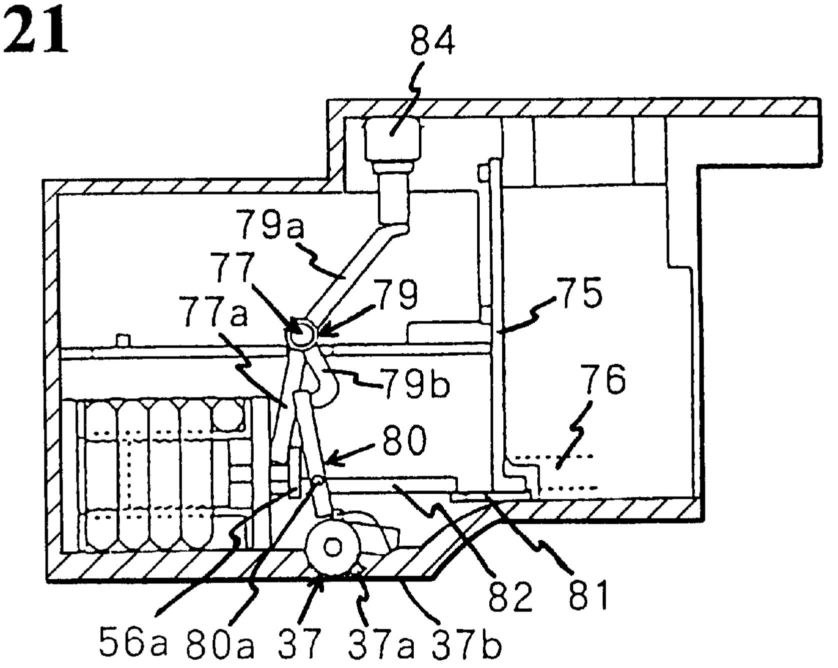
FIG. 21 is a side view of the overcurrent trip device of FIG. 20.
Figure 22:
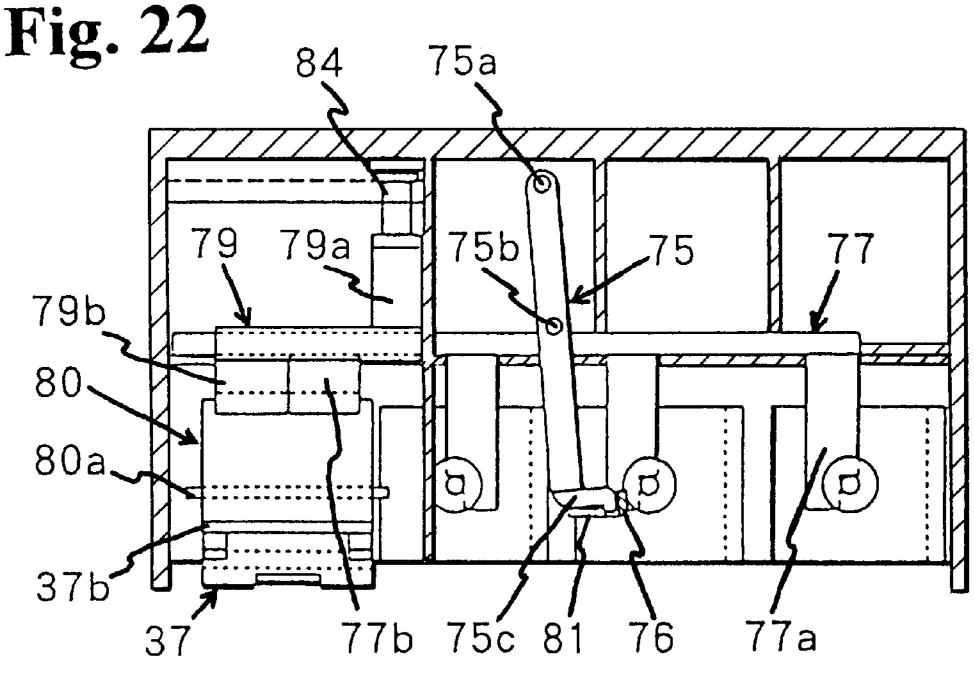
FIG. 22 is a front view of the overcurrent trip device of FIG. 20.
Figure 23:
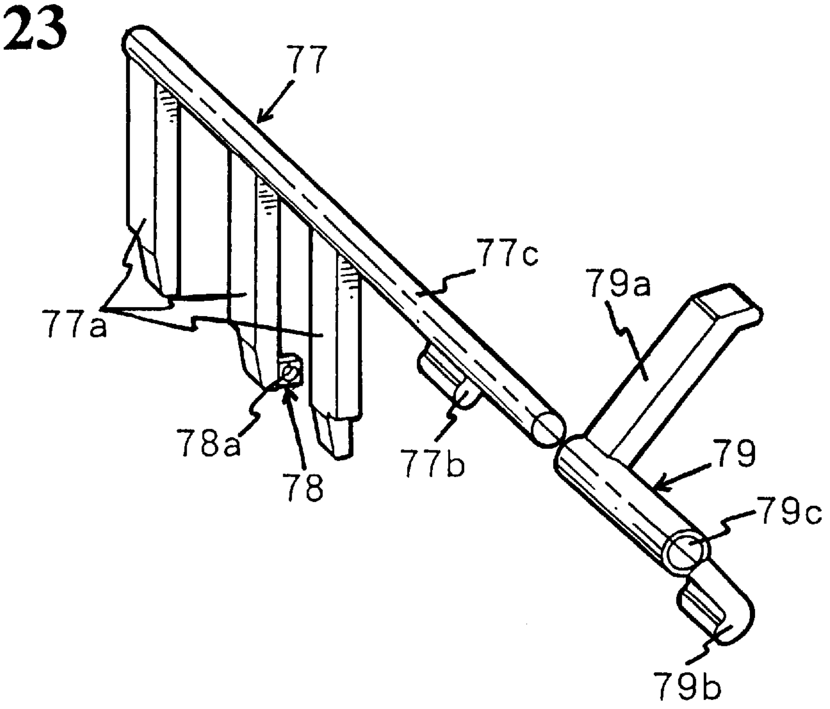
FIG. 23 is an exploded perspective view showing the instantaneous cross bar and the trip button cross bar.

The instantaneous trip operation will be explained more in detail below. FIG. 18 is a top plan view of the overcurrent trip device, from which the time delay trip portion is omitted, before the instantaneous trip operation. FIG. 19 is a side view of the overcurrent trip device of FIG. 18. FIG. 20 is a top plan view of the overcurrent trip device after the instantaneous trip operation. FIG. 21 is a side view of the overcurrent trip device of FIG. 20. FIG. 22 is a front view of the overcurrent trip device of FIG. 20. In FIGS. 18 through 22, the time delay trip portion 4*a* is omitted for the sake of easy understanding. FIG. 23 is an exploded perspective view showing the instantaneous cross bar and the trip button cross bar.

A flange 56*a* is formed on an end of the plunger 56 for each phase. The flange 56*a* is coupled to an end of an arm 77*a* for each phase of an instantaneous cross bar 77 shaped as illustrated in FIG. 23. A coupling portion 78 for coupling an instantaneous interlock plate described later is disposed on the central arm 77*a*. A hook 77*b* is disposed on a side of the instantaneous cross bar 77. An extended portion of an axis 77*c* is rotatably inserted to a bore 79*c* of a trip button cross bar 79 (FIG. 18). The trip button cross bar 79 includes an arm 79*a* and a hook 79*b*. The hook 79*b* is positioned adjacent to the hook 77*b* as shown in FIG. 18 in the state in which the instantaneous cross bar 77 is inserted into the bore 79*c* of the trip button crossbar 79. The instantaneous cross bar 77 is rotatably supported inside the overcurrent trip device 4. The trip button cross bar 79 is rotatably supported on the axial end of the instantaneous cross bar 77.

As shown in FIG. 21, a sub-cross bar 80 for interlocking between the trip cross bar 37 and the instantaneous cross bar 77 and for interlocking between the trip cross bar 37 and the trip button cross bar 79 is disposed rotatably around a pivotal support axis 80*a*. As shown in FIG. 22, the sub-cross bar 80 is shaped like a rectangular plate including an upper end facing the hooks 77*b* and 79*b* and a lower end facing an operating rod 37*b* of the trip cross bar 37. Referring now to FIGS. 18 and 19, a rotational interlock plate 81 shaped as illustrated in FIGS. 24 and 25 is disposed rotatably around a pivotal axis 81*a* in the horizontal plane in the vicinity of the lower operating portion 75*c* of the shifter drive plate 75. An arm 81*b* extending from the rotational interlock plate 81 faces the under step portion of the operating portion 75*c*. An instantaneous interlock plate 82 is disposed between the rotational interlock plate 81 and the instantaneous cross bar 77. An end of the instantaneous interlock plate 82 is inserted into a slit 81*c* of the rotational interlock plate 81 via a protrusion 82*a*, and the other end of the interlock plate 82 is inserted into a bore 78*a* (FIG. 23) of the coupling portion 78 on the instantaneous cross bar 77 via a pin 83. As shown in FIG. 19, a trip button 84 and a return spring (not shown) are disposed in the upper face of the cover 19*a*. The arm 79*a* of the trip button cross bar 79 faces the lower end face of the trip button 84.

In the structure described above, as shown in FIG. 21, when the plunger 56 is attracted, the flange 56*a* rotates the instantaneous cross bar 77 clockwise through the arm 77*a* and the instantaneous cross bar 77 rotates the sub-cross bar 80 counterclockwise through the hook 77*b*. The sub-cross bar 80 rotates the trip cross bar 37 clockwise through the operating rod 37*b* and releases the coupling of the nail 37*a* and the latch hold 36. As a result, the first contact 5 and the second contact 6 linking to the first contact 5 are opened. The instantaneous cross bar 77 rotates the rotational interlock plate 81 counterclockwise through the instantaneous interlock plate 82 as shown in FIG. 20, and the rotational interlock plate 81 rotates the shifter drive plate 75 counterclockwise around the pivotal protruding axis 75*a* through the arm 81*b* as shown in FIG. 22. By this operation, the contact operating mechanism 76 is pushed, and the control contact 11 is opened to break the control circuit. The second contact 6 is opened in linkage with the first contact 5. The second contact 6 is securely opened and maintained at the open circuit state after the trip operation by opening the control circuit for the magnet 8 simultaneously with opening the second contact 6.

In FIG. 8, the open-close mechanism 7 that has executed the instantaneous trip operation is reset by turning the handle 7*a* to the right from the trip position toward the off-position. By turning the handle 7*a* toward the off-position, the latch 34 is lifted up by the pin 63 on the end of the handle lever 43 and rotated clockwise. Then, the end of the latch 34 couples again with the latch hold 36. Since the latch 34 pushes the operating link 49 to the right via the pin 52 and since the armature 46 rotates counterclockwise with its protrusion 46*b*, protruding toward the open-close mechanism 7 (FIG. 11) pushed by the extending portion 43*a* of the handle lever 43 (FIG. 4), the pin 50 enters the U-groove 48*a* formed in the hook 48 of the armature 46 to return to the off-position (the reset state) of FIG. 9. Then, by turning the handle 7*a* to the left toward the on-position, the open-close spring 44 is extended and energized and the first contact 5 resumes the on-state of FIG. 7. Though not shown in the figures, the latch hold 36 and the trip cross bar 37 are provided with return springs (not shown) for always urging the latch hold 36 and the trip cross bar 37 counterclockwise to cooperate with the foregoing reset operation.

In FIG. 3, the first contact 5 and the second contact 6 are provide with respective arc quenching rooms including arc quenching grids 59 and 60 of U-shaped magnetic plates. The respective ends of the arc quenching grids 59 and 60 are supported by press fitting to a pair of insulative walls 61 extending between the contacts 5 and 6. The space between the arc quenching grids 59 and 60 are continuous such that an arc quenching space is used commonly by the first contact 5 and the second contact 6. By this structure, the arc quenching space for the contacts 5 and 6 is substantially widened and the arc quenching capability is improved as compared to the structure where the individual arc quenching spaces are separately formed. A commutation plate 62, bent as illustrated in FIG. 3, is arranged between the arc quenching grids 59 and 60. The commutation plate 62 is disposed for commutating the movable contact side end of the arc caused between the movable and stationary contacts to interrupt a high current. Once after the commutation is accomplished, the current flows through the commutation plate 62, and the overcurrent trip device 4, for example, is prevented from being damaged by the high current that would otherwise have flown through the normal current path of the circuit breaker.

In the embodiment described above, since the circuit breaker 1 contains the first contact 5 and the second contact 6 in a common insulative container, the wiring work and wiring space between the contacts 5 and 6 are not necessary. Sine the first contact 5 and the second contact 6 open simultaneously when a short-circuit is caused, it is possible to interrupt a high short-circuit current. Moreover, since the intermediate tap 12 connected to the first contact 5 and the second contact 6 is disposed, it is possible to connect multiple second contacts to the first contact by connecting an electromagnetic contactor to the intermediate tap 12.

Figure 26:
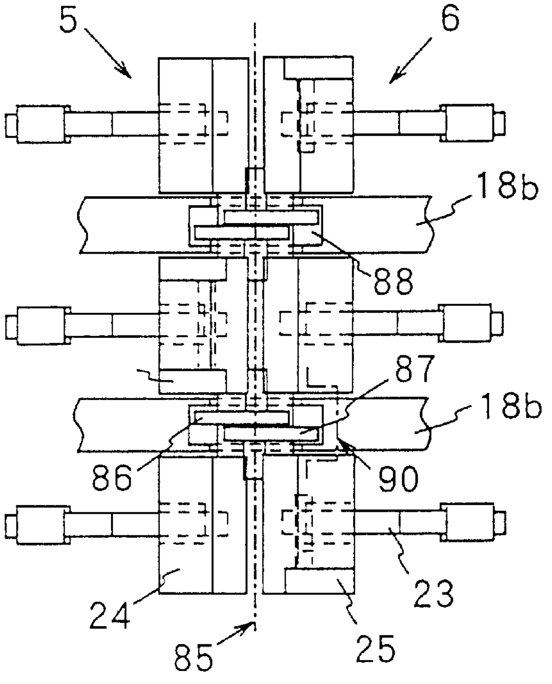
FIG. 26 is a top plan view of the movable contact.
Figure 27:
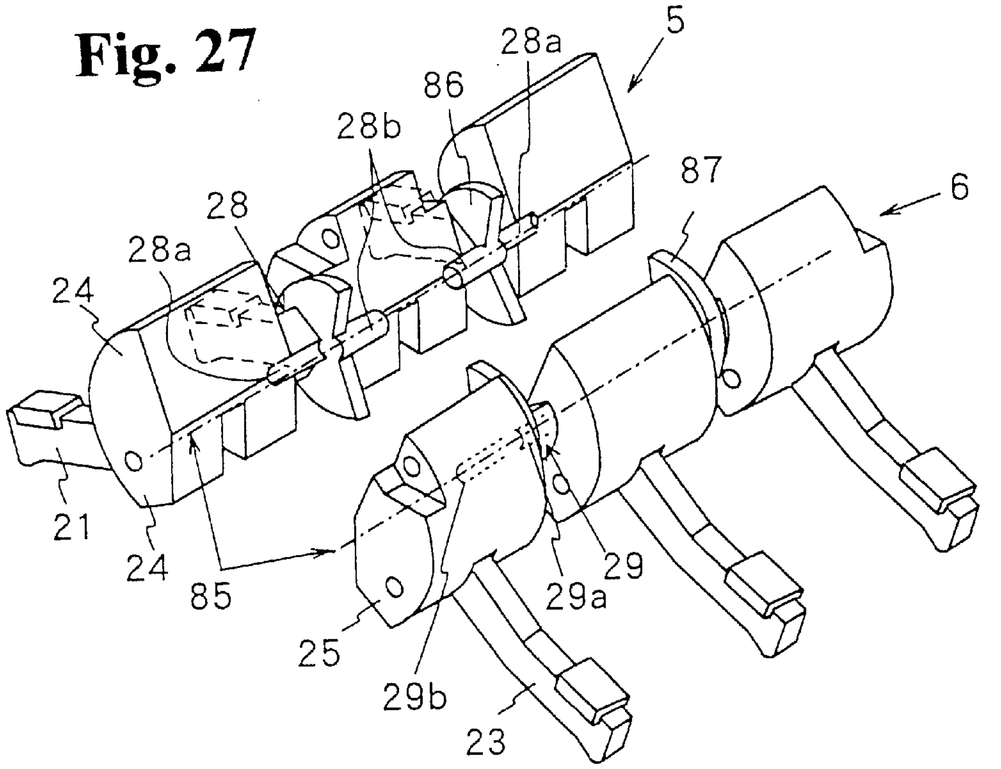
FIG. 27 is an exploded perspective view of the movable contact.
Figure 28:
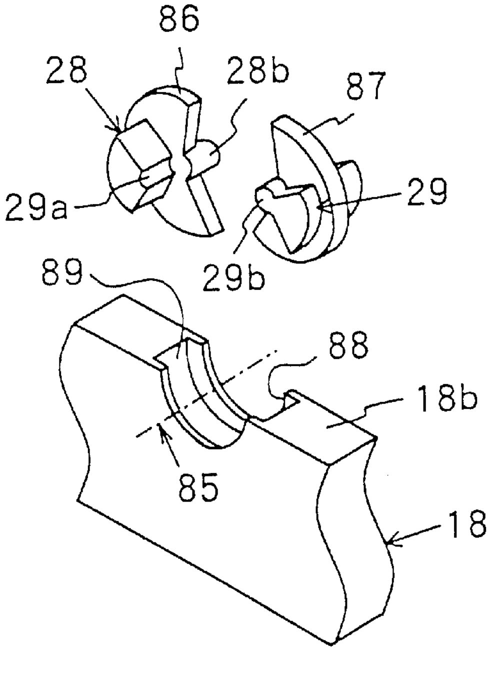
FIG. 28 is an exploded perspective view of a switching axis supported by an inter-phase separation wall.

Now the holders concentrically arranged around the rotation center will be explained in detail below with reference to FIGS. 26 through 29. FIG. 26 is a top plan view of the movable contact. FIG. 27 is a perspective view of the movable contact. FIG. 28 is an exploded perspective view of the switching axes supported by the inter-phase separation walls.

Referring now to FIGS. 26 through 28, each of the switching axes 28 and 29, which unitarily connect the holders 24 and 25 for each phase, is shaped with a fan having a pivot for the rotation center. A cylindrical recess 28*a* and a cylindrical protrusion 28*b* are formed on the rotation center of the switching axis 28. A cylindrical recess 29*a* to which the protrusion 28*b* is inserted and a cylindrical protrusion 29*b* insertable to the recess 28*a* are formed on the rotation center of the switching axis 29. Semicircular insulation plates 86, expanding slightly wider than 180 degrees, are formed on the inter-phase positions of the switching axis 28. Semicircular insulation plates 87, expanding slightly wider than 180 degrees, are formed on the inter-phase positions of the switching axis 29.

The holders 24 and 25 form a rotation center 85 with the respective protrusions 28*b* and 29*b* inserted to the respective recesses 29*b* and 28*b*. The holders 24 and 25 are rotatably supported by the inter-phase separation walls 18*b* of the casing 18 through the switching axes 28 and 29. A pair of semicircular bearing grooves 88 is formed in the facing planes of the inter-phase separation wall 18*b* and the inter-phase separation wall (not shown) of the cover. In FIG. 26, only the inter-phase separation wall 18*b* and the bearing groove 88 on the side of the casing 18 are shown.

In FIG. 28, the switching axes 28 and 29 constructed in inverted structures with each other are inserted into the bearing grooves 88. The switching axes 28 and 29 are independently supported rotatably around the rotation center 85 by the sliding contact of their semicircular circumferences and the inner surfaces of the bearing grooves 88. The insulation plates 86, 87 located inside a recess 89 are displaced in the axial direction from each other. The displaced insulation plates 86, 87 overlap each other as shown in FIG. 26 in the state that the switching axes 28 and 29 are coupled. The insulation plates 86 and 87 slide on each other as the switching axes 28 and 29 rotate.

Figure 29A:
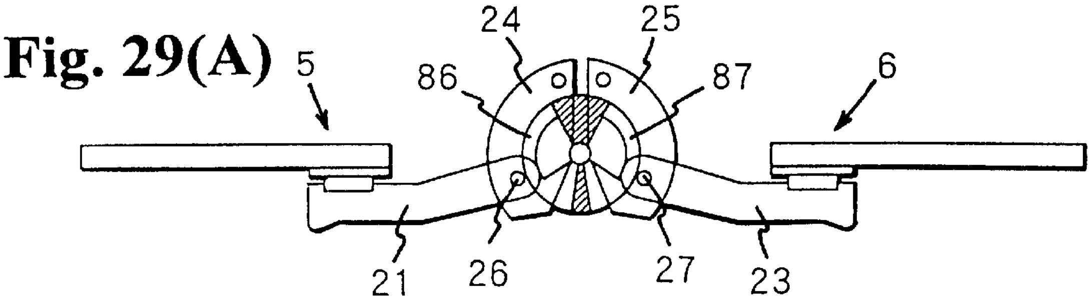
FIG. 29(A) is a side view showing an overlapping condition of insulator plates of the movable contact of FIG. 26, wherein the first and second contacts are closed.
Figure 29B:
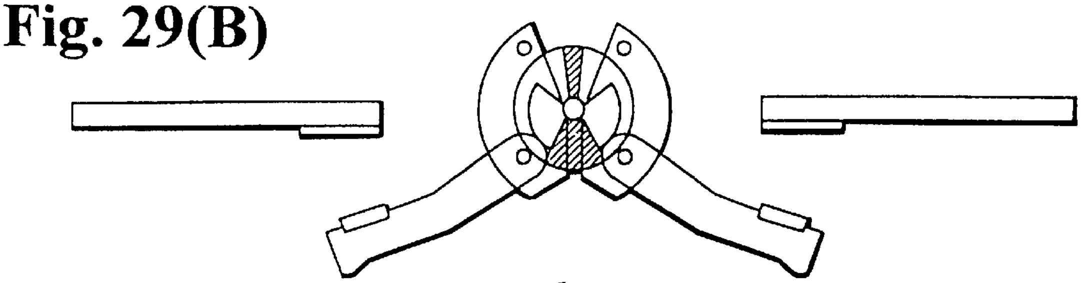
FIG. 29(B) is a side view showing the overlapping condition of the insulator plates, wherein the first and second contacts are opened.
Figure 29C:
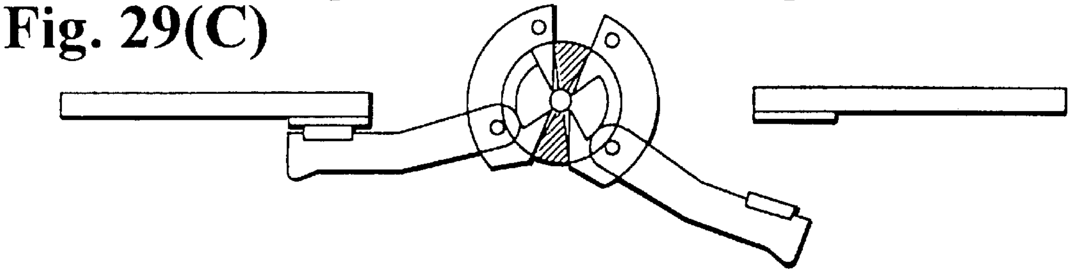
FIG. 29(C) is a side view showing the overlapping condition of the insulator plates, wherein the first contact is closed and the second contact is opened.

FIG. 29(A) is a side view showing the overlap of the insulator plates of the movable contact of FIG. 26 when the contacts 5 and 6 are closed. FIG. 29(B) is a side view showing the overlap of the insulator plates of the movable contact of FIG. 26 when the contacts 5 and 6 are opened. FIG. 29(C) is a side view showing the overlap of the insulator plates of the movable contact of FIG. 26 when the first contact 5 is closed and the second contact 6 is opened. The insulation plates 86 and 87 overlap in the hatched portions such that the overlapping insulation plates 86 and 87 form a complete circle. By this structure, a large creeping distance 90 (FIG. 26) is obtained. By arranging the holders 24 and 25 of the contacts 5 and 6 concentrically around the rotation center 85, the circuit breaker is shortened in its axial direction as compared with the case in which the individual rotation centers of the holders 24 and 25 are spaced from each other.

Figure 30:
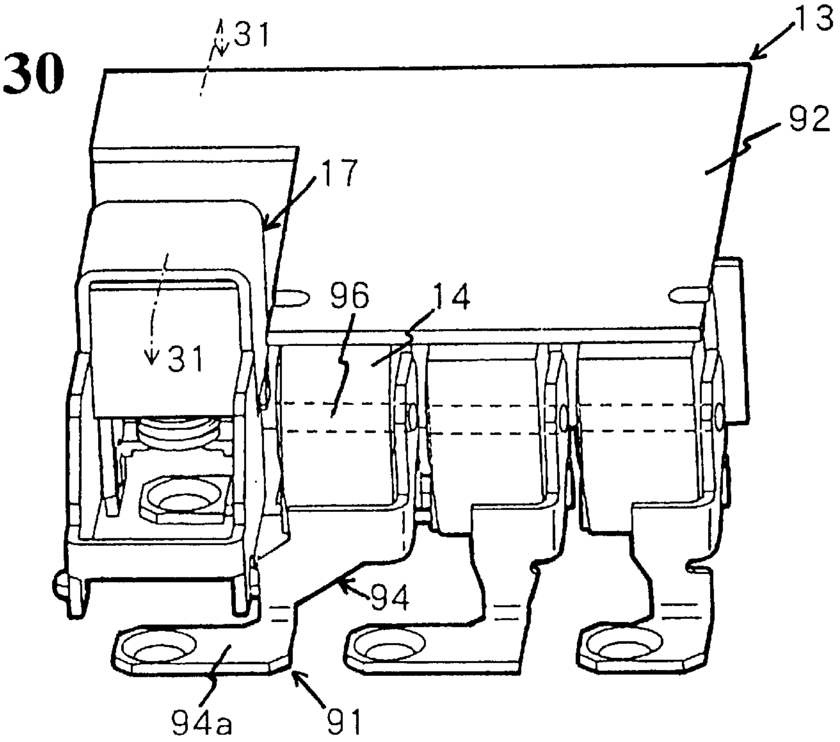
FIG. 30 is a perspective view of the electronic overcurrent trip device seen from the second contact side (load side)
Figure 31:
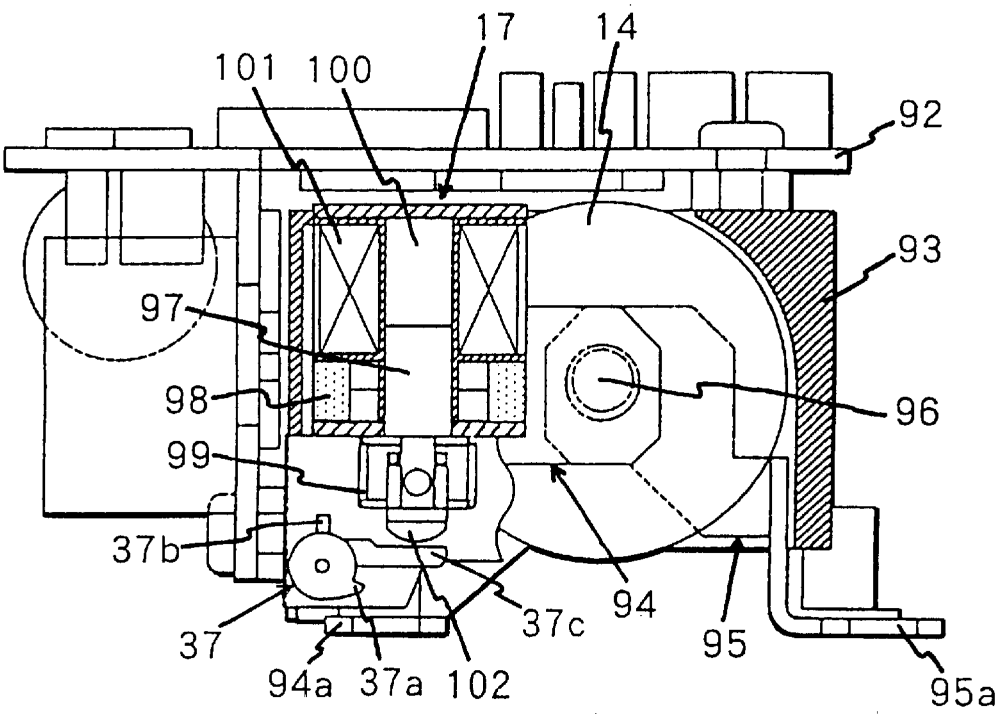
FIG. 31 is a cross sectional view taken along line 31—31 in FIG. 30 showing the non-operating state of the electronic overcurrent trip device.
Figure 32:
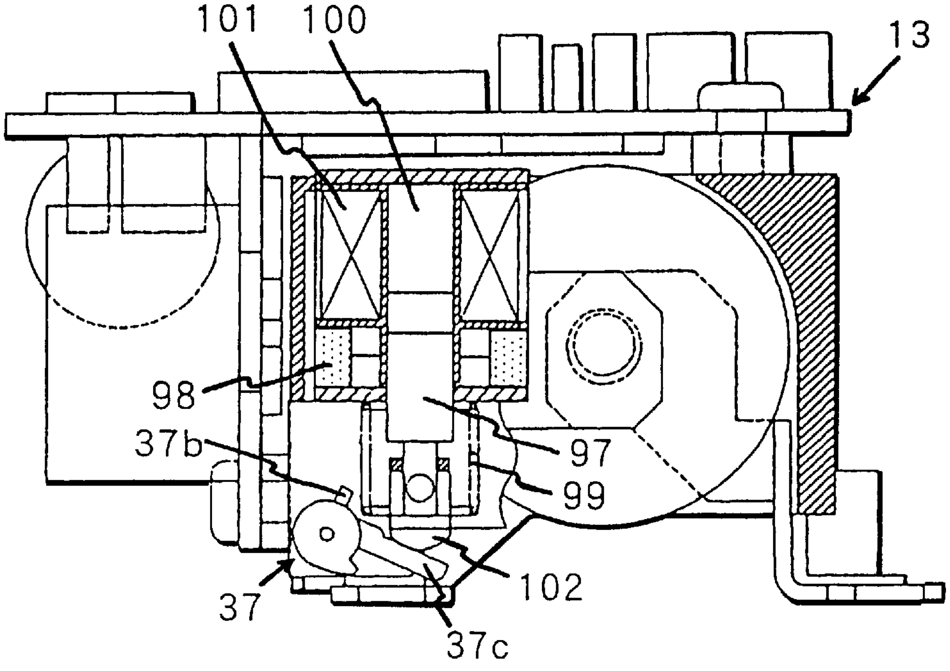
FIG. 32 is a cross sectional view similar to FIG. 31 showing the operating state of the electronic overcurrent trip device.

FIGS. 30 through 32 show an electronic overcurrent trip device that detects the overcurrent with a current transformer. FIG. 30 is a perspective view of the electronic overcurrent trip device seen from the second contact side (load side). FIG. 31 is a cross sectional view taken along line 31—31 of FIG. 30 showing the non-operating state of the electronic overcurrent trip device. FIG. 32 is a cross sectional view similar to FIG. 31 showing the operating state of the electronic overcurrent trip device.

The electronic overcurrent trip device 13 includes a current transformer 14 for each phase, a main circuit conductor 91 for each phase, a printed circuit board 92 for mounting the electronic circuit, a trip electromagnet 17 and a unit casing 93 for integrally housing the above described constituents. The main circuit conductor 91 for each phase includes two flat connecting conductors 94 and 95 located on both sides of the transformer 14, i.e. on the power supply and load sides, and sandwiching the current transformer 14; and a through conductor 96 consisting of a circular rod extending between the conductors 94 and 95 through the current transformer 14. Terminal portions 94*a* and 95*a*, screwed to the connector plates 30 and 31 of the first contact 5 and the second contact 6, are formed in the respective end portions of the connecting conductors 94 and 95.

Referring now to FIGS. 31 and 32, the trip electromagnet 17 is constructed as a magnetic hold type. A movable core 97 is normally attracted to compress a trip spring 99 to a stationary core 100 by the magnetic flux of a permanent magnet 98. When a trip signal is inputted to a trip coil 101 and the magnetic flux of the permanent magnet 98 is weakened by the magnetic flux of the trip coil 101, the spring force of the trip spring 99 exceeds the attraction force of the permanent magnet 98 and the movable core 97 is driven downward. The movable core 97 pushes the arm 37*c* of the trip cross bar 37 through a trip plate 102 attached to the head of the movable core 97. The trip cross bar 37 is rotated clockwise and the nail 37*a* is released from the latch hold 36 (FIG. 3). The first contact 5 and the second contact 6 are opened as in the thermal-drive and electromagnetic type overcurrent trip device 4. The trip cross bar 37 may be used commonly for the thermal-drive and electromagnetic type overcurrent trip device 4 and for the electronic overcurrent trip device 17. As shown in FIG. 5, two arms 37*c* to which the trip plate 102 of the overcurrent trip device 13 pushes are arranged so that the arms 37*c* do not collide with the latch hold 36 rotating clockwise in the trip operation. Corresponding to the arms 37*c*, the trip plate 102 is formed in a gate shape so that the feet of the gate can push the arms 37*c*.

The electronic overcurrent trip device 13 may be used in place of the thermal-drive and electromagnetic type overcurrent trip device 4 in FIG. 3. The electronic overcurrent trip device 13 is fixed to the connector plates 30 and 31 via the terminal portions 94*a* and 95*a* by screws. The thermal-drive and electromagnetic type overcurrent trip device 4 is incorporated in the cover 19*a* of the circuit breaker and inserted to the relay conductors 69 and 71. But, the electronic overcurrent trip device 13 is screwed as described above and covered by another cover (not shown). The current transformer 14 detects an current flowing in the through conductor 96 constituting a part of the current path and outputs a current signal indicating the current value to the electronic circuit on the printed circuit board 92. The electronic circuit detects the overcurrent based on the current value indicated by the current signal and outputs a trip signal after a period of time corresponding to the current value has elapsed.

When an overcurrent is caused by overload, the trip signal is inputted to the trip relay 15 (FIG. 2) to open the second contact 6 by opening the relay contact 16 inserted to the control circuit of the electromagnet 8. When a high current, such as a short circuit current is caused, the trip signal is inputted to the trip electromagnet 17 to open the first contact 5 and the second contact 6 as described above. The trip electromagnet 17 is operated when the overcurrent exceeds a certain level, to open the first contact 5 and the second contact 6.

Figure 33:
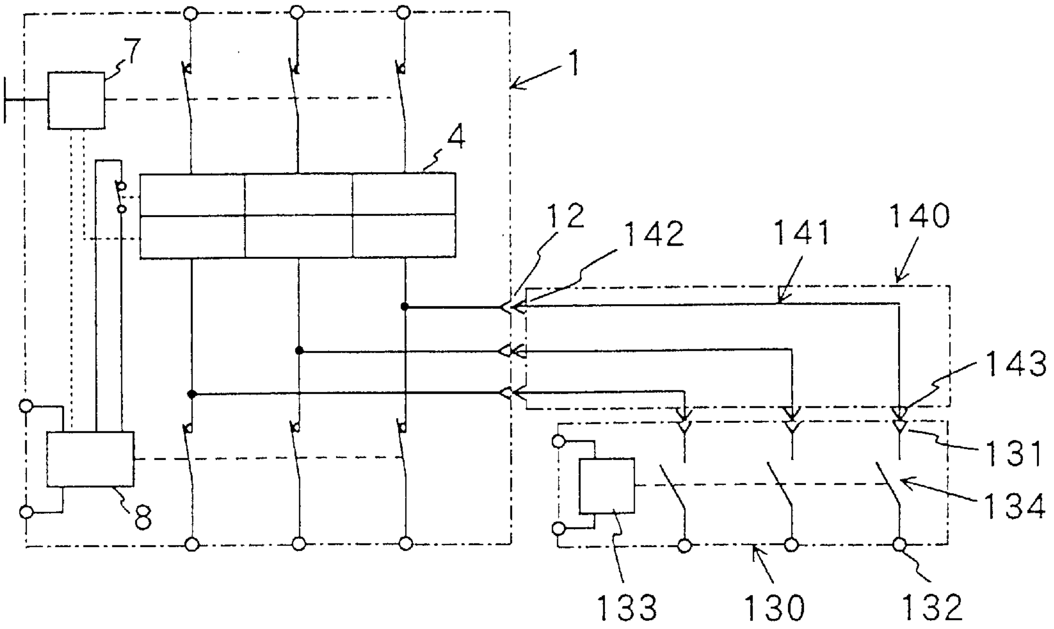
FIG. 33 is an internal connection showing an additional electromagnetic contactor connected to an intermediate tap of the circuit breaker of FIG. 1.
Figure 34:
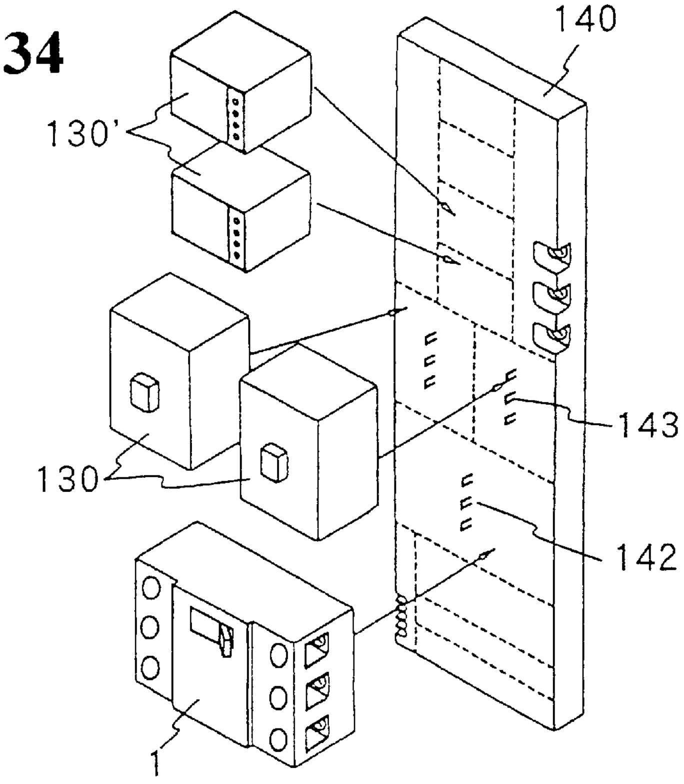
FIG. 34 is an exploded perspective view for showing an outside of the device in FIG. 33.

FIG. 33 is an internal connection showing that a different electromagnetic contactor 130 is connected to the intermediate tap 12 of the circuit breaker 1 of FIG. 1. FIG. 34 is an external shape thereof. Referring now to FIG. 33, the electromagnetic contactor 130 includes second contacts 134, each being interposed between a power supply side terminal 131 and a load supply side terminal 132. The second contact 134 is remotely controlled by an electromagnet 133. The power supply side terminal 131 is a plug-in type similar to the intermediate tap 12. The power supply side terminal 131 is arranged on the mounting plane of the electromagnetic contactor 130. The electromagnetic contactor 130 is connected indirectly via a connection board 140. The connection board 140 includes conductors 141, each being buried for a phase in a flat molded base. Connection terminals 142 and 143 corresponding respectively to the intermediate tap 12 of the circuit breaker 1 and the power supply side terminal 131 of the electromagnetic contactor 130 are arranged on the upper surface of the connection board 140. The circuit breaker 1 and two electromagnetic contactors 130 are arranged on the connection board 140 as shown in FIG. 34 and connected with each other through the conductor 141 by the plug-in connection of the respective terminals. Additional units 130' which exhibit an alarm function or a measurement function may also be mounted on the connection board 140.

Figure 35:
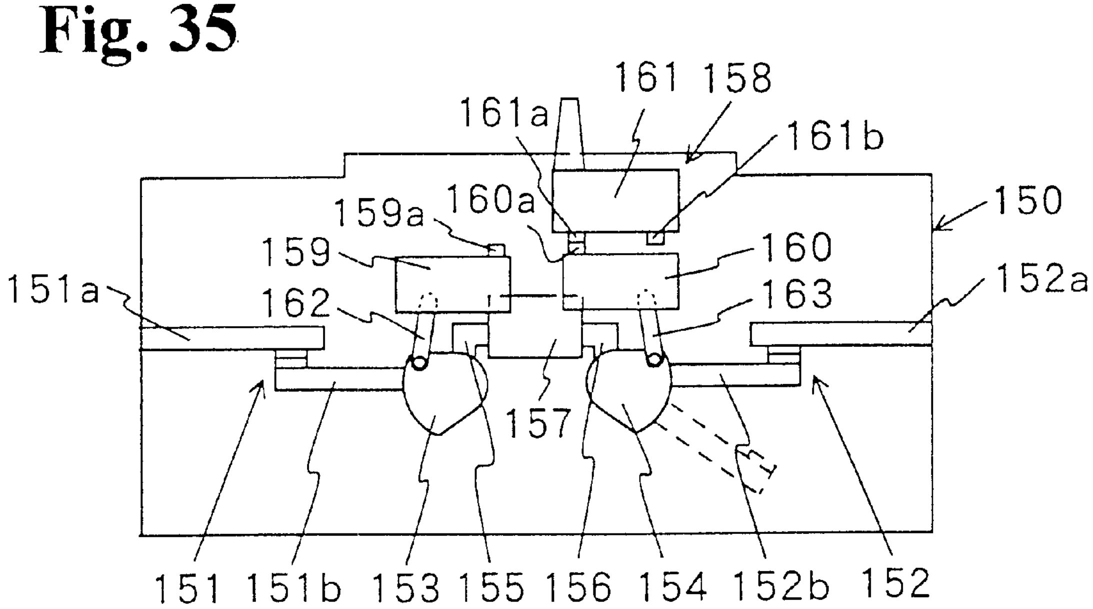
FIG. 35 is an explanatory side view of another embodiment of a circuit breaker according to the invention, which opens and closes either one of the contacts.
Figure 36:
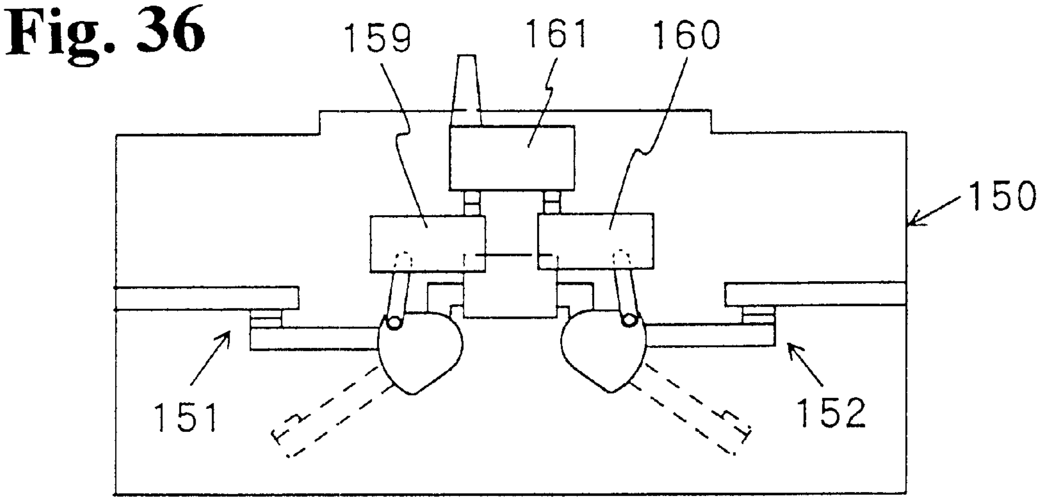
FIG. 36 is an explanatory side view of the embodiment of the circuit breaker shown in FIG. 35, wherein both contacts are opened or closed.
Figure 37:
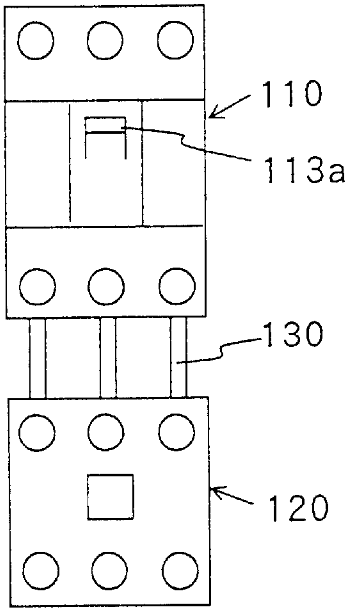
Fig. 37 Prior Art
FIG. 37 is a front view of a conventional combination of a circuit breaker and an electromagnetic switch.
Figure 38:
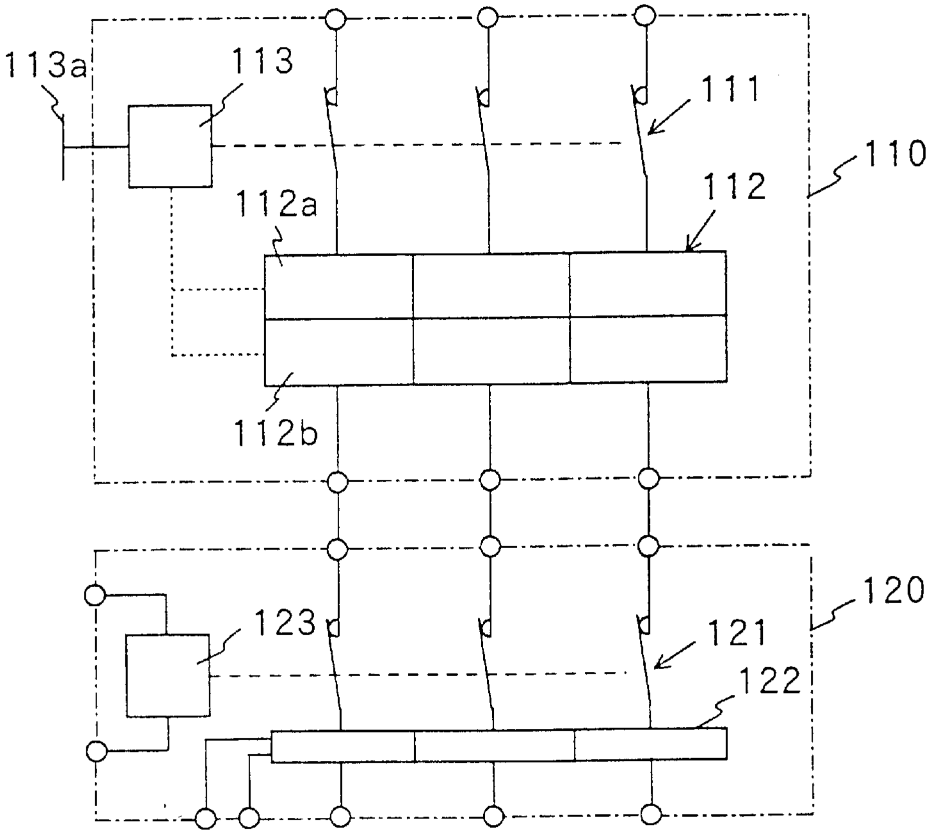
Fig. 38 Prior Art
FIG. 38 shows internal connections of the conventional circuit breaker and electromagnetic switch of FIG. 37.

FIG. 35 is an explanatory side view of an embodiment of a circuit breaker according to the invention, which opens and closes either one of the contacts. FIG. 36 is a side view of an embodiment of a circuit breaker according to the invention, which opens and closes both contacts. In FIGS. 35 and 36, an open-close mechanism is disposed commonly for two contacts, and the open-close mechanism is divide into transmission portions and a driving portion. Referring now to FIGS. 35 and 36, two contacts 151 and 152 are arranged in series in a current path for a phase housed in an insulative container 150. The contact 151 includes a stationary contactor 151*a* that works also as a power supply side terminal and a movable contactor 151*b* held in an insulative holder 153. The contact 152 includes a stationary contactor 152*a* that works also as a load side terminal and a movable contactor 152*b* held in an insulative holder 154. The movable contactors 151*b* and 152*b* are connected with each other by connecting conductors 155 and 156, with which the contactors 151*b* and 152*b* slidably contact, and a trip coil (not shown) of an overcurrent trip device 157 is inserted between the conductors 155 and 156.

The open-close mechanism 158 includes two transmission portions 159 and 160 and a driving portion 161 common to the transmission portions 159 and 160. The transmission portions 159 and 160 are connected to the respective holders 153 and 154 via respective links 162 and 163. The driving portion 161 generates the switching force of the contacts 151 and 152. When the latch is unlocked by the switching operation of the operating handle in the reset state or by the trip signal from the overcurrent trip device 157, the driving portion 161 releases the energy stored in the switching spring and outputs the switching force to two output terminals 161*a* and 161*b*. The transmission portions 159 and 160 open and close the holders 153 and 154 in response to the switching force received from the driving portion 161. The transmission portions 159 and 160 include respective input terminals 159*a* and 160*a* corresponding to the output terminals 161*a* and 161*b*.

The output terminals 161*a* and 161*b* are so constructed as to be connectable and detachable to and from the corresponding input terminals 159*a* and 160*a*. The driving portion 161 is connected to either one of the transmission portions 159 and 160 as shown in FIG. 35 via the terminals 161*a* and 159*a* or via the terminals 161*b* and 160*a*. Or, the driving portion 161 is connected to the transmission portions 159 and 160 as shown in FIG. 36 via the terminals 161*a* and 159*a* and via the terminals 161*b* and 160*a*. In FIG. 35, either one of the contacts 151 and 152 is opened and closed. In FIG. 36, the contacts 151 and 152 are simultaneously opened and closed. By the structure described above, the life of one of the contacts may be prolonged by opening and closing the other contact in the small current region. By simultaneously opening and closing both contacts in the high current region, secure current interruption is facilitated.

In the above described embodiment, the driving portion was explained exemplary by way of a manual operation. A motor or an electromagnet may be used for obtaining the driving force of the driving portion. The connection and separation of the transmission portions and the driving portion were explained by way of a manual operation, but the transmission portions and the driving portion may be coupled and detached by judging whether the current should be interrupted by both contacts or either one of the contacts based, for example, on the overcurrent value. Although the transfer of the driving portion between the transmission portions was exemplary described, the driving portion may be positioned always between the transmission portions, and specific input and output terminals may be selectively connected. Or, the driving portion may be located at a specific position and a specific second contact may be selected by transferring a specific transmission portion or input terminal.

The circuit breaker of the invention exhibits the following effects.

By housing the first contacts and second contacts in an insulative container, both contacts are compactly integrated, so that the wiring work between both contacts becomes unnecessary and the installation space for the circuit breaker is reduced. Since the first contact and second contact simultaneously open when a short-circuit is caused, arc voltages are generated in series, so that the current limiting effect is enhanced, and interruption of a high short-circuit current is facilitated. By disposing an intermediate tap between the first contact and second contact on each current path and by connecting an electromagnetic contactor for a branch system, multiple sets of the second contacts may be connected easily to the common first contacts.

What is claimed is:

1. A circuit breaker comprising:

a current path having a first contact and a second contact arranged in series;

an open-close mechanism connected to the first contact, said open-close mechanism releasing energy stored therein in response to a reset operation to thereby open the first contact;

an electromagnet connected to the second contact, said electromagnet opening and closing said second contact in response to a control signal;

an overcurrent trip device for detecting an overcurrent in said current path, said overcurrent trip device, upon detecting the overcurrent in said current path, providing one of two trip signals, one trip signal being transferred to said open-close mechanism and said electromagnet to open said first and second contacts simultaneously and the other trip signal being transferred to said electromagnet to open only the second contact; and an insulative container for housing therein said current path with the first contact and the second contact, said open-close mechanism, said electromagnet and said overcurrent trip device.

2. A circuit breaker according to claim 1, wherein said open-close mechanism opens said first contact and said second contact after a predetermined period of time has passed since said open-close mechanism detected an overcurrent caused by over load.

3. A circuit breaker according to claim 1, further comprising an intermediate tap disposed on said insulative container for connecting an external device, said intermediate tap being situated between said first contact and said second contact.

4. A circuit breaker according to claim 1, further comprising insulative holders for holding movable contacts of said first and second contacts, said holders being rotatably supported on said insulative container to form a common rotational axis.

5. A circuit breaker according to claim 1, wherein said open-close mechanism opens said first contact and said second contact immediately after said open-close mechanism has detected a short-circuit current.

6. A circuit breaker according to claim 1, further comprising arc quenching rooms for retaining said first and second contacts, an arc quenching space situated between the arc quenching rooms for allowing the arc quenching rooms to communicate with each other through the arc quenching space, and a commutation plate disposed in said arc quenching space for bridging said arc quenching rooms.

7. A circuit breaker according to claim 1, wherein said current path having the first and second contacts is formed for each phase, and a plurality of said current paths is disposed in the insulative container.

8. A circuit breaker according to claim 1, wherein said overcurrent trip device includes a time delay portion for detecting overload in the current path and providing said other trip signal, and an instantaneous trip portion for detecting a short-circuit current in the current path and providing said one trip signal.

9. A circuit breaker according to claim 1, wherein said open-close mechanism opens said second contact after a predetermined period of time has passed since the open-close mechanism detected an overcurrent caused by over load.

10. A circuit breaker according to claim 9, wherein said electromagnet comprises a control circuit, said electromagnet opening said second contact by opening said control circuit.

11. A circuit breaker according to claim 9, wherein said electromagnet has a mechanical linkage linking with the open-close mechanism to open the second contact.

12. A circuit breaker comprising:

a current path having two contacts connected in series;

an open-close mechanism disposed in common to said two contacts, said open-close mechanism including two transmission portions for opening and closing said two contacts, respectively, and a driving portion for providing an operating force to said transmission portions, said driving portion being selectively connectable to at least one of said transmission portions;

an overcurrent trip device for detecting an overcurrent in said current path, said overcurrent trip device, upon detecting the overcurrent, feeding a trip signal to said open-close mechanism; and an insulative container for housing therein said current path including said contacts, said open-close mechanism and said overcurrent trip device.

13. A circuit breaker according to claim 11, wherein said driving portion is connectable to said two transmission portions at a same time.

14. A circuit breaker comprising:

a current path having a first contact and a second contact arranged in series;

an open-close mechanism connected to the first contact, said open-close mechanism releasing energy stored therein in response to a reset operation to thereby open the first contact;

an electromagnet connected to the second contact, said electromagnet opening and closing said second contact in response to a control signal;

an overcurrent trip device for detecting an overcurrent in said current path, said overcurrent trip device, upon detecting the overcurrent in said current path, feeding a trip signal to said open-close mechanism and said electromagnet;

an insulative container for housing therein said current path with the first contact and the second contact, said open-close mechanism, said electromagnet and said overcurrent trip device; and an intermediate tap disposed on said insulative container for connecting an external device, said intermediate tap being situated between said first contact and said second contact.

* * * * *

UNITED STATES PATENT AND TRADEMARK OFFICE

CERTIFICATE OF CORRECTION

PATENT NO. : 5,901,025

DATED : May 4,1999

INVENTOR(S) : Tatsunori Takahashi, Takumi Fujihira, Naoshi Uchida,Katsunori Kuboyama, Hiroaki Tosaka,Kentaro Toyama, Koji Nomura, Isamu Nagahiro It is certified that error appears in the above-identified patent and that said Letters Patent is hereby corrected as shown below:

In column 8, line 9, change "pin" to --link--; and
change "link" to --pin--;

In column 15, line 11, change "divide" to --divided--; and

In column 16, line 40, after "simultaneously" add comma.

Signed and Sealed this

Ninth Day of May, 2000

Attest:

Q. TODD DICKINSON

Attesting Officer

*Director of Patents and Trademarks*